US010636379B2

(12) United States Patent
Feng et al.

(10) Patent No.: US 10,636,379 B2
(45) Date of Patent: Apr. 28, 2020

(54) SHIFT REGISTER UNIT, METHOD FOR DRIVING THE SAME, GATE DRIVING CIRCUIT AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Xuehuan Feng, Beijing (CN); Quanhu Li, Beijing (CN); Yongqian Li, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

(*) Notice: Subject to any disclaimer, the term of this patent is extended or adjusted under 35 U.S.C. 154(b) by 0 days.

(21) Appl. No.: 16/226,359

(22) Filed: Dec. 19, 2018

(65) Prior Publication Data

US 2019/0325834 A1 Oct. 24, 2019

(30) Foreign Application Priority Data

Apr. 24, 2018 (CN) .......................... 2018 1 0374154

(51) Int. Cl.
*G09G 3/36* (2006.01)
*G06F 3/038* (2013.01)

(52) U.S. Cl.
CPC ......... *G09G 3/3677* (2013.01); *G09G 3/3648* (2013.01)

(58) Field of Classification Search
CPC combination set(s) only.
See application file for complete search history.

(56) References Cited

U.S. PATENT DOCUMENTS

2010/0097368 A1* 4/2010 Hwang ................ G09G 3/3677 345/213
2014/0044229 A1* 2/2014 Chan ...................... G11C 19/28 377/70
2017/0039950 A1* 2/2017 Li ........................ G09G 3/3266
2018/0350315 A1* 12/2018 Zhang .................. G09G 3/3677
2019/0066596 A1* 2/2019 Xue ..................... G09G 3/3266

* cited by examiner

*Primary Examiner* — Pegeman Karimi
(74) *Attorney, Agent, or Firm* — Brooks Kushman P.C.

(57) ABSTRACT

A shift register unit, a driving method, a gate driving circuit, and a display device are provided. The shift register unit includes an input reset circuit; a first storage node potential maintaining circuit; a second storage node potential control circuit; a pull-up node control circuit for controlling the potential of the pull-up node to be a valid level under the control of the second storage node, the second clock signal input end, and the fourth clock signal input end, and controlling to connect or disconnect the pull-up node and the second voltage input end under the control of the second clock signal input end and the third clock signal input end; a pull-up node potential maintaining circuit; a pull-down node control circuit; and a gate driving output circuit.

23 Claims, 11 Drawing Sheets

SHIFT REGISTER UNIT, METHOD FOR DRIVING THE SAME, GATE DRIVING CIRCUIT AND DISPLAY DEVICE

CROSS-REFERENCE TO RELATED APPLICATION

This application claims priority to Chinese Patent Application No. 201810374154.5 filed on Apr. 24, 2018, which is incorporated herein by reference in its entirety.

TECHNICAL FIELD

The present disclosure relates to the field of display driving technology, in particular to a shift register unit and a method for driving the shift register unit.

BACKGROUND

At present, for an externally compensated gate driving circuit, a pulse width used for the gate electrode output needs to be adjustable, and the problems of electric leakage of the oxide thin film transistor (TFT) and a weak output voltage loading capacity due to the cascade need to be solved. Moreover, an existing gate driving circuit cannot effectively store a pulse signal inputted by a shift register unit of a previous stage, thereby affecting the output of the gate driving signal of the current stage.

SUMMARY

In one aspect, a shift register unit

In some embodiments of the present disclosure, a shift register unit includes an input end, a reset end, and a gate driving signal output end, wherein the shift register unit further includes: an input reset circuit, connected to the input end, the reset end, a first voltage input end and a first storage node, and configured to control to connect or disconnect the first storage node and the input end under the control of the input end, and to control to connect or disconnect the first storage node and the first voltage input end under the control of the reset end; a first storage node potential maintaining circuit, configured to, when the input reset circuit controls to disconnect the first storage node and the first voltage input end under the control of the reset end, maintain a potential of the first storage node; a second storage node potential control circuit, connected to the first storage node, the second storage node, and the first clock signal input end, and configured to control to connect or disconnect the second storage node and the first clock signal input end under the control of the first storage node; a pull-up node control circuit, connected to the second storage node, a second clock signal input end, a third clock signal input end, a fourth clock signal input end and a second voltage input end, and configured to control the potential of the pull-up node to be a valid level under the control of the second storage node, the second clock signal input end, and the fourth clock signal input end, control to connect or disconnect the pull-up node and the second voltage input end under the control of the second clock signal input end and the third clock signal input end; a pull-up node potential maintaining circuit, connected to the pull-up node; a pull-down node control circuit, connected to the pull-down node, the pull-up node, the pull-down node control end, and a third voltage input end; and a gate driving output circuit, connected to the pull-up node, the pull-down node, the gate driving signal output end, a fourth voltage input end and a fifth voltage input end.

In some embodiments, the pull-up node control circuit includes: a first pull-up control node control sub-circuit, connected to the first pull-up control node, the third clock signal input end, the fourth clock signal input end, and the second voltage input end, and configured to control to connect or disconnect the first pull-up control node and the fourth clock signal input end under the control of the fourth clock signal input end, and control to connect or disconnect the first pull-up control node and the second voltage input end under the control of the third clock signal input end; a second pull-up control node control sub-circuit, connected to the second pull-up control node, the second clock signal input end, the third clock signal input end, and the second voltage input end, and configured to control to connect or disconnect the second pull-up control node and the third clock signal input end under the control of the third clock signal input end, and control to connect or disconnect the second pull-up control node and the second voltage input end under the control of the second clock signal input end; a first pull-up node control sub-circuit, connected to the first pull-up control node, the second storage node, and the pull-up node, and configured to control to connect or disconnect the second storage node and the pull-up node under the control of the first pull-up control node; and a second pull-up node control sub-circuit, connected to the second pull-up control node, the pull-up node and the second voltage input end, and configured to control to connect or disconnect the pull-up node and the second voltage input end under the control of the second pull-up control node.

In some embodiments, the pull-up node potential maintaining circuit comprises a first capacitor, a first end of the first capacitor is connected to a fifth clock signal input end, and a second end of the first capacitor is connected to the pull-up node.

In some embodiments, the shift register unit further includes a pull-up node potential control circuit, connected to the fifth clock signal input end, the first pull-up control node and the second voltage input end, and configured to control to connect or disconnect the first pull-up control node and the second voltage input end under the control of the fifth clock signal input end.

In some embodiments, the pull-up node potential control circuit comprises a pull-up node potential control transistor, a gate electrode of the pull-up node potential control transistor being connected to the fifth clock signal input end, a first electrode of the pull-up node potential control transistor being connected to the first pull-up control node, and a second electrode of the pull-up node potential control transistor being connected to the second voltage input end.

In some embodiments, the shift register unit further includes a clock receiving control circuit and a storage reset circuit, wherein the first end of the first capacitor is connected to the fifth clock signal input end through the clock receiving control circuit; the clock receiving control circuit is further connected to the second storage node, and configured to control to connect or disconnect the first end of the first capacitor and the fifth clock signal input end under the control of the second storage node; and the storage reset circuit is connected to the reset end, the first end of the first capacitor and the sixth voltage input end, and configured to control to connect or disconnect the first end of the first capacitor and the sixth voltage input end under the control of the reset end.

In some embodiments, the clock receiving control circuit comprises a clock receiving control transistor; a gate electrode of the clock receiving control transistor is connected to the second storage node, and a first electrode of the clock receiving control transistor is connected to the fifth clock signal input end, and a second electrode of the clock receiving control transistor is connected to the first end of the first capacitor; and the storage reset circuit comprises a storage reset transistor, a gate electrode of the storage reset transistor is connected to the reset end, a first electrode of the storage reset transistor is connected to a first end of the first capacitor, and a second electrode of the storage reset transistor is connected to the sixth voltage input end.

In some embodiments, the shift register unit further includes a carry signal output end and a carry output circuit, wherein the carry output circuit is connected to the pull-up node, the pull-down node, the carry signal output end, the fourth voltage input end and the seventh voltage input end, configured to control to connect the carry signal output end and the fourth voltage input end when the potential of the pull-up node is a valid level, and control to connect the carry signal output end and the seventh voltage input end when the potential of the pull-down node is a valid level; the carry signal output end is configured to provide a reset signal for a reset end of the shift register unit of previous stage, and is configured to provide an input signal to an input end of the shift register unit of next stage; and the pull-up node potential maintaining circuit further comprises a second capacitor, the first end of the second capacitor is connected to the pull-up node, and the second end of the second capacitor is connected to the carry signal output end.

In some embodiments, the pull-down node control circuit is configured to control a potential of the pull-down node to be a valid level under the control of the pull-down node control end, and control to connect or disconnect the pull-down node and the third voltage input end under the control of the pull-up node; and the gate driving output circuit is configured to control to connect the gate driving signal output end and the fourth voltage input end when the potential of the pull-up node is a valid level, and control to connect the gate driving signal output end and the fifth voltage input end when the potential of the pull-down node is a valid level.

In some embodiments, the gate driving output circuit comprises a first gate driving output transistor and a second gate driving output transistor, a gate electrode of the first gate driving output transistor is connected to the pull-up node, a first electrode of the first gate driving output transistor is connected to the fourth voltage input end, and a second electrode of the first gate driving output transistor is connected to the gate driving signal output end; a gate electrode of the second gate driving output transistor is connected to the pull-down node, a first electrode of the second gate driving output transistor is connected to the gate driving signal output end, and a second electrode of the second gate driving output transistor is connected to the fifth voltage input end; the carry output circuit comprises a first carry signal output transistor and a second carry signal output transistor; a gate electrode of the first carry signal output transistor is connected to the pull-up node, a first electrode of the first carry signal output transistor is connected to the fourth voltage input end, and a second electrode of the first carry signal output transistor is connected to the carry signal output end; and a gate electrode of the second carry signal output transistor is connected to the pull-down node, a first electrode of the second carry signal output transistor is connected to the carry signal output end, and a second electrode of the second carry signal output transistor is connected to the seventh voltage input end.

In some embodiments, the first storage node potential maintaining circuit comprises a third capacitor; a first end of the third capacitor is connected to the first storage node, and a second end of the third capacitor is connected to the first voltage input end; and the second storage node potential control circuit comprises a second storage node potential control transistor; a gate electrode of the second storage node potential control transistor is connected to the first storage node, and a first electrode of the second storage node potential control transistor is connected to the first clock signal input, and the second electrode of the second storage node potential control transistor is connected to the second storage node.

In some embodiments, the input reset circuit comprises an input transistor and a reset transistor; a gate electrode of the input transistor and a first electrode of the input transistor are both connected to the input end, and a second electrode of the input transistor is connected to the first storage node; and a gate electrode of the reset transistor is connected to the reset end, a first electrode of the reset transistor is connected to the first storage node, and a second electrode of the reset transistor is connected to the first voltage input end.

In some embodiments, the first pull-up node control sub-circuit comprises a first control transistor and a second control transistor; a gate electrode of the first control transistor and a gate electrode of the second control transistor are both connected to the first pull-up control node, a first electrode of the first control transistor is connected to the second storage node, and a second electrode of the first control transistor is connected to a first electrode of the second control transistor, a second electrode of the second control transistor is connected to the pull-up node; the first pull-up control node control sub-circuit comprises a third control transistor and a fourth control transistor; a gate electrode of the third control transistor and a first electrode of the third control transistor are connected to the fourth clock signal input end, a second electrode of the third control transistor is connected to the first pull-up control node; a gate electrode of the fourth control transistor is connected to the third clock signal input end, the first electrode of the fourth control transistor is connected to the first pull-up control node, and a second electrode of the fourth control transistor is connected to the second voltage input end; the second pull-up node control sub-circuit comprises a fifth control transistor and a sixth control transistor; a gate electrode of the fifth control transistor and a gate electrode of the sixth control transistor are connected to the second pull-up control node, a first electrode of the fifth control transistor is connected to the pull-up node, a second electrode of the fifth control transistor is connected to a first electrode of the sixth control transistor, and a second electrode of the sixth control transistor is connected to the second voltage input end; and the second pull-up control node control sub-circuit comprises a seventh control transistor and an eighth control transistor; a gate electrode of the seventh control transistor and a first electrode of the seventh control transistor are both connected to the third clock signal input end, a second electrode of the seventh control transistor is connected to the second pull-up control node; a gate electrode of the eighth control transistor is connected to the second clock signal input end, the first electrode of the eighth control transistor is connected to the second pull-up control node, and a second electrode of the eighth control transistor is connected to the second voltage input end.

In some embodiments, the shift register unit further includes a leakage eliminating circuit, wherein the leakage eliminating circuit is connected to the carry signal output end, the gate driving signal output end, and the second electrode of the first control transistor and a second electrode of the fifth control transistor, and configured to control to connect or disconnect the gate driving signal output end and the second electrode of the first control transistor under the control of the carry signal output end, and control do connect or disconnect the gate driving signal output end and the second electrode of the fifth control transistor.

In some embodiments, the leakage eliminating circuit comprises a leakage eliminating transistor; a gate electrode of the leakage eliminating transistor is connected to the carry signal output end, and a first electrode of the leakage eliminating transistor is connected to a second electrode of the first control transistor and the second electrode of the fifth control transistor, and the second electrode of the leakage eliminating transistor is connected to the gate driving signal output end.

In some embodiments, the pull-down node control end comprises a third clock signal input end and a fourth clock signal input end; the pull-down node control circuit comprises a first pull-down node control transistor, a second pull-down node control transistor, and a third pull-down node control transistor; a gate electrode of the first pull-down node control transistor and a first electrode of the first pull-down node control transistor are both connected to the third clock signal input end, and a second electrode of the first pull-down node controls transistor is connected to the pull-down node; a gate electrode of the second pull-down node control transistor and a first electrode of the second pull-down node control transistor are both connected to the fourth clock signal input end, and a second electrode of the second pull-down node transistor is connected to the pull-down node; a gate electrode of the third pull-down node control transistor is connected to the pull-up node, a first electrode of the third pull-down node control transistor is connected to the pull-down node, and a second electrode of the third pull-down node control transistor of the transistor is connected to the third voltage input end; the third clock signal input end is configured to input a third clock signal, and the fourth clock signal input end is configured to input a fourth clock signal, and the third clock signal and the fourth clock signal have inverted phases.

In some embodiments, the shift register unit further includes a storage node reset circuit, connected to the reset control end, the first storage node, the second storage node, and the eighth voltage input end, and configured to control to the first storage node and the second storage node to be both connected to the eighth voltage input end under the control of the reset control end.

In another aspect, a method for driving the shift register unit includes: within a display period, in an input phase, the input reset circuit controls to connect the first storage node and the input end under the control of the input end, and the first storage node potential maintaining circuit controls to maintain the potential of the first storage node; the second storage node potential control circuit controls to connect the second storage node and the first clock signal input end under the control of the first storage node; the pull-down node control circuit controls the potential of the pull-down node to be a valid level under the control of the pull-down node control end; the pull-up node control circuit controls to connect the pull-up node and the second voltage input end under the control of the second clock signal input end and the third clock signal input end; the gate driving output circuit controls the gate driving signal output end to output a fifth voltage under the control of the pull-up node and the pull-down node; in an output stage, the input reset circuit controls to disconnect the connection between the first storage node and the input end under the control of the input end, the first storage node potential maintaining circuit controls to maintain the potential of the first storage node; the second storage node potential control circuit controls to connect the second storage node and the first clock signal input end under the control of the first storage node; the pull-up node control circuit controls the potential of the pull-up node to be a valid level under the control of the second storage node, the second clock signal input end and the fourth clock signal input end; a pull-down node control circuit controls to connect the pull-down node and the third voltage input end under the control of the pull-up node; the gate driving output circuit controls the gate driving signal output end to output the fourth voltage under the control of the pull-up node and the pull-down node; and in a reset phase, the input reset circuit controls to connect the first storage node and the reset end under the control of the reset end, and the second storage node potential control circuit controls to disconnect the connection between the second storage node and the first clock signal input end under control of the first storage node; the pull-up node control circuit controls to connect the pull-up node and the second voltage input end under the control of the second clock signal input end and the third clock signal input end; the pull-down node control circuit controls the potential of the pull-down node to be a valid level under the control of the pull-down node control end, the gate driving output circuit controls the gate driving signal output end to output a fifth voltage under the control of the pull-up node and the pull-down node.

In some embodiments, the pull-up node control circuit comprises a first pull-up control node control sub-circuit, a second pull-up control node control sub-circuit, a first pull-up node control sub-circuit, and a second pull-up node control sub-circuit; in the output stage, the pull-up node control circuit controls the potential of the pull-up node to be a valid level under the control of the second storage node, the second clock signal input end and the fourth clock signal input end includes: in the output stage, the first clock signal input end, the second clock signal input end, and the fourth clock signal input end all inputting a first level, and controlling, by the second storage node potential control circuit, to connect the second storage node and the first clock signal input end under the control of the first storage node, thereby controlling the potential of the second storage node to be a first level; controlling, the first pull-up control node control sub-circuit, the potential of the first pull-up control node to be a first level under the control of the fourth clock signal input end, and controlling, by the first pull-up node control sub-circuit, to connect the second storage node and the pull-up node under the control of the first pull-up control node, and controlling, by the second pull-up control node control sub-circuit, the potential of the second pull-up control node to be a second level under the control of the second clock signal input end, controlling, by a second pull-up node control sub-circuit, to disconnect the pull-up node and the second voltage input end under the control of the second pull-up control node, so that the potential of the pull-up node is a valid level.

In some embodiments, the pull-up node potential maintaining circuit comprises a first capacitor, the first end of the first capacitor is connected to the fifth clock signal input end, the second end of the first capacitor is connected to the pull-up node; the shift register unit further comprises a pull-up node potential control circuit, and the method further includes: in the output stage, after the first pull-up node control sub-circuit controls to connect the second storage node and the pull-up node under the control of the first pull-up control node, controlling, by the pull-up node potential control circuit, to connect the first pull-up control node and the second voltage input end under control of the fifth clock signal input end, and controlling, by the first pull-up node sub-circuit, to disconnect the second storage node and the pull-up node under control of the first pull-up control node, and the potential of the pull-up node being pulled up by the bootstrap of the first capacitor.

In some embodiments, the pull-up node potential maintaining circuit comprises a first capacitor, the first end of the first capacitor is connected to the fifth clock signal input end, the second end of the first capacitor is connected to the pull-up node; the shift register unit further comprises a clock receiving control circuit and a storage reset circuit, the first end of the first capacitor is connected to the fifth clock signal input end through the clock receiving control circuit; the method further includes: in the output stage, controlling, by the clock receiving control circuit, to connect the fifth clock signal input end and the first end of the first capacitor under the control of the second storage node, the potential of the pull-up node being pulled up by the bootstrap of the first capacitor; and in the reset phase, controlling, by the storage reset circuit, to reset the potential of the first end of the first capacitor under the control of the reset end, to release charge stored in the first capacitor.

In another aspect, a gate driving circuit includes multiple stages of the above mentioned shift register units.

In yet another aspect, a display device includes the above mentioned gate driving circuit.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the disclosed embodiments are only a part of embodiments and not all embodiments. Based on the disclosed embodiments, a person skilled in the art may obtain other embodiments without creative work, which all fall into the scope of the present disclosure.

The transistors employed in the embodiments of the present disclosure may each be a thin film transistor or a field effect transistor or other device having the same characteristics. In the embodiments of the present disclosure, in order to distinguish two electrodes of the transistor except the gate electrode, one electrode is referred to as a first electrode, and the other electrode is referred to as a second electrode. In actual operation, the first electrode may be a drain electrode, and the second electrode may be a source electrode; or the first electrode may be a source electrode, and the second electrode may be a drain electrode.

Figure 1:
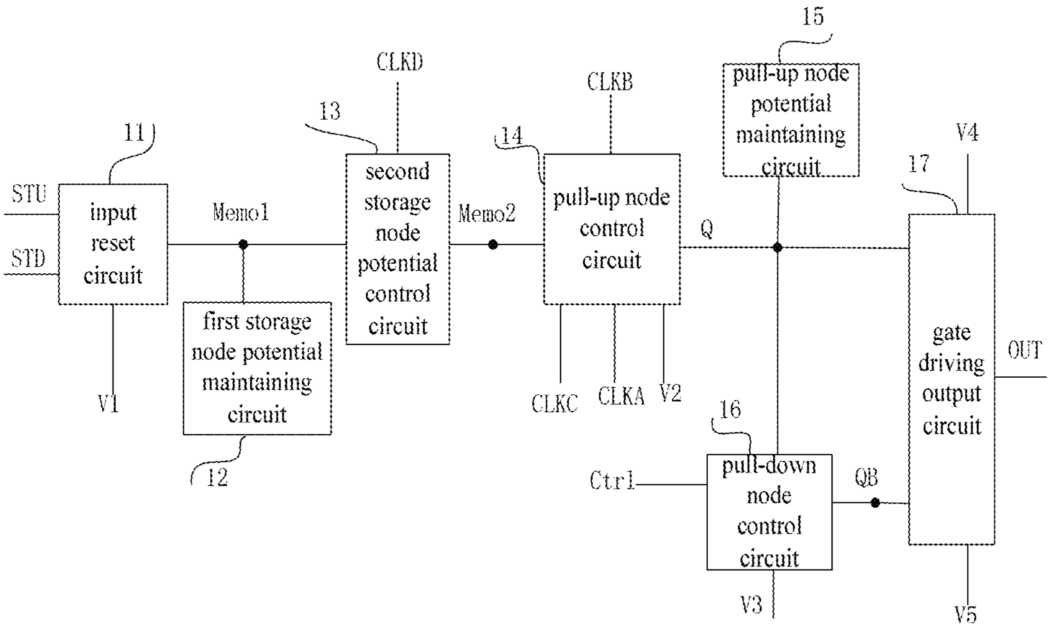
FIG. 1 is a schematic diagram of a shift register unit according to at least one embodiment of the present disclosure.

As shown in FIG. 1, the shift register unit includes an input end STU, a reset end STD, and a gate driving signal output end OUT. The shift register unit further includes an input reset circuit 11, a first storage node potential maintaining circuit 12, a second storage node potential control circuit 13, a pull-up node control circuit 14, a pull-up node potential maintaining circuit 15, a pull-down node control circuit 16 and a gate driving output circuit 17.

The input reset circuit 11 is connected to the input end STU, the reset end STD, a first voltage input end and a first storage node Memo1, and configured to control to connect or disconnect the first storage node Memo1 and the input end STU under the control of the input end STU, connect or disconnect the first storage node Memo1 and the first voltage input end under the control of the reset end STD, the first voltage input end is used to input a first voltage V1.

The first storage node potential maintaining circuit 12 is configured to, when the input reset circuit controls to disconnect the first storage node Memo1 and the first voltage input end under the control of the reset end STD, maintain a potential of the first storage node Memo1.

The second storage node potential control circuit 13 is connected to the first storage node Memo1, the second storage node Memo2, and the first clock signal input end CLKD, and configured to control to connect or disconnect the second storage node Memo2 and the first clock signal input end CLKD under the control of the first storage node Memo1.

The pull-up node control circuit 14 is connected to a pull-up node Q, the second storage node Memo2, a second clock signal input end CLKC, a third clock signal input end CLKA, a fourth clock signal input end CLKB and a second voltage input end, and configured to control the potential of the pull-up node Q to be a valid level under the control of the second storage node Memo2, the second clock signal input end CLKC, and the fourth clock signal input end CLKB, control to connect or disconnect the pull-up node Q and the second voltage input end under the control of the second clock signal input end CLKC and the third clock signal input end CLKA. The second voltage input end are used to input the second voltage V2.

The pull-up node potential maintaining circuit 15 is connected to the pull-up node Q.

The pull-down node control circuit 16 is connected to the pull-down node QB, the pull-up node Q, the pull-down node control end Ctrl, and a third voltage input end.

The gate driving output circuit 17 is connected to the pull-up node Q, the pull-down node QB, the gate drive signal output end OUT, a fourth voltage input end and a fifth voltage input end. The third voltage input end is for inputting a third voltage V3, the fourth voltage input end is for inputting a fourth voltage V4, and the fifth voltage input end is for inputting a fifth voltage V5.

In some embodiments, V1, V2, and V3 may all be a first low voltage VGL1, V4 may be a high voltage VGH, and V5 may be a second low voltage VGL2, but not limited thereto. Among them, VGL1 and VGL2 are DC low voltage signals, and VGH is a DC high voltage signal, where both low voltage and high voltage refer to levels at which corresponding transistors can be turned on or off.

In the shift register unit, the input reset circuit is connected to the first storage node Memo1 rather than directly connected to the pull-up node Q. The first storage node potential maintaining circuit is connected to the first storage node Memo1, rather than directly connected to the pull-up node Q. The shift register unit adapts the input reset circuit, the first storage node potential maintaining circuit and the second storage node potential control circuit to store a pulse signal inputted by the shift register unit of the previous stage, the pulse signal is stored in the first storage node potential maintaining circuit (the first storage node potential maintaining circuit may include a first storage capacitor), the potential of the second storage node Memo2 may be controlled by the first clock signal inputted by CLKD. The pull-up node control circuit controls the potential of the pull-up node Q to be a valid level under the control of the second storage node Memo2 (the potential of the Memo2 is controlled by the first clock signal input end CLKD) and the second clock signal input end (the valid level is the level at which a transistor controlling the connection between its gate electrode and Q is turned on, for example, when the transistor is an n-type transistor, the valid level is a high voltage, and when the transistor is a p-type transistor, the valid level is a low voltage), so as to control the pulse modulation of the gate driving signal by controlling the first clock signal and the second clock signal, so that the pulse width of the gate driving signal is adjustable.

In some embodiments of the present disclosure, as shown in FIG. 1, the shift register unit is in operation, within a display period, there are an input phase, an output phase and a reset phase.

In the input phase, the input reset circuit 11 controls to connect the first storage node Memo1 and the input end STU under the control of the input end STU, and the first storage node potential maintaining circuit 12 controls to maintain the potential of the first storage node Memo1; the second storage node potential control circuit 13 controls to connect the second storage node Memo2 and the first clock signal input end CLKD under the control of the first storage node Memo1; the pull-down node control circuit 16 controls the potential of the pull-down node QB to be a valid level (the valid level is the level at which a transistor controlling the connection between its gate electrode and Q is turned on, for example, when the transistor is an n-type transistor, the valid level is a high voltage, and when the transistor is a p-type transistor, the valid level is a low voltage) under the control of the pull-down node control end Ctrl; the pull-up node control circuit 14 controls to connect the pull-up node Q and the second voltage input end under the control of the second clock signal input end CLKC and the third clock signal input end CLKA; the gate driving output circuit 17 controls the gate driving signal output end OUT to output a fifth voltage V5 under the control of the pull-up node Q and the pull-down node QB.

In the output stage, the input reset circuit 11 controls to disconnect the connection between the first storage node Memo1 and the input end STU under the control of the input end STU, the first storage node potential maintaining circuit 12 controls to maintain the potential of the first storage node Memo1; the second storage node potential control circuit 13 controls to connect the second storage node Memo2 and the first clock signal input end CLKD under the control of the first storage node Memo1; the pull-up node control circuit 14 controls the potential of the pull-up node Q to be a valid level under the control of the second storage node Memo2, the second clock signal input end CLKC and the fourth clock signal input end CLKB; a pull-down node control circuit 16 controls to connect the pull-down node QB and the third voltage input end under the control of the pull-up node Q; the gate driving output circuit 17 controls the gate driving signal output end OUT to output the fourth voltage V4 under the control of the pull-up node Q and the pull-down node QB.

In the reset phase, the input reset circuit 11 controls to connect the first storage node Memo1 and the reset end STD under the control of the reset end STD, and the second storage node potential control circuit 13 controls to disconnect the connection between the second storage node Memo2 and the first clock signal input end CLKD under control of the first storage node Memo1; the pull-up node control circuit 14 controls to connect the pull-up node Q and the second voltage input end under the control of the second clock signal input end CLKC and the third clock signal input end CLKA; the pull-down node control circuit 16 controls the potential of the pull-down node Q to be a valid level under the control of the pull-down node control end Ctrl, the gate driving output circuit 17 controls the gate driving signal output end OUT to output a fifth voltage V5 under the control of the pull-up node Q and the pull-down node QB.

Figure 2:
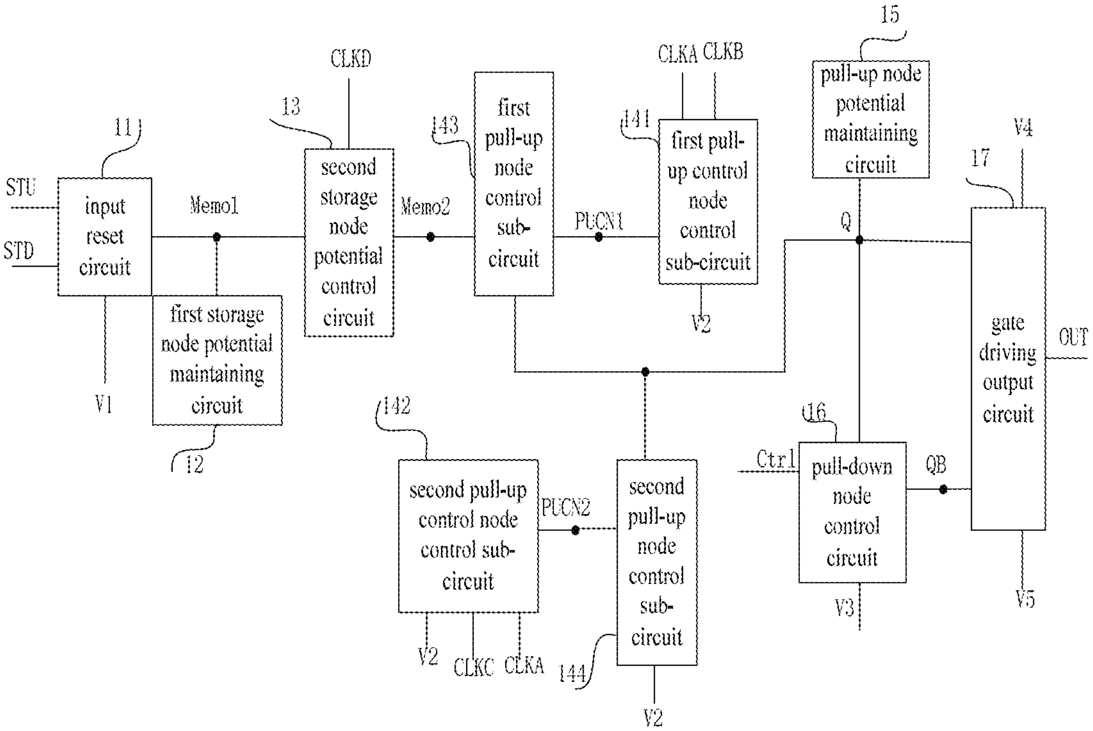
FIG. 2 is another schematic diagram of a shift register unit according to at least one embodiment of the present disclosure.

Specifically, as shown in FIG. 2, on the basis of the shift register unit shown in FIG. 1, the pull-up node control circuit 14 includes a first pull-up control node control sub-circuit 141, a second pull-up control node control sub-circuit 142, a first pull-up node control sub-circuit 143 and a second pull-up node control sub-circuit 144.

The first pull-up control node control sub-circuit 141 is connected to the first pull-up control node PUCN1, the third clock signal input end CLKA, the fourth clock signal input end CLKB, and the second voltage input end, and configured to control to connect or disconnect the first pull-up control node PUCN1 and the fourth clock signal input end CLKB under the control of the fourth clock signal input end CLKB, and control to connect or disconnect the first pull-up control node PUCN1 and the second voltage input end under the control of the third clock signal input end CLKA.

The second pull-up control node control sub-circuit 142 is connected to the second pull-up control node PUCN2, the second clock signal input end CLKC, the third clock signal input end CLKA, and the second voltage input end, and configured to control to connect or disconnect the second pull-up control node PUCN2 and the third clock signal input end CLKA under the control of the third clock signal input end CLKA, and control to connect or disconnect the second pull-up control node PUCN2 and the second voltage input end under the control of the clock signal input end CLKC.

The first pull-up node control sub-circuit 143 is connected to the first pull-up control node PUCN1, the second storage node Memo2, and the pull-up node Q, and configured to control to connect or disconnect the second storage node Memo2 and the pull-up node Q under the control of the first pull-up control node PUCN1.

The second pull-up node control sub-circuit 144 is connected to the second pull-up control node PUCN2, the pull-up node Q, and the second voltage input end, and configured to control to connect or disconnect the pull-up node Q and the second voltage input end under the control of the second pull-up control node PUCN2.

In actual operation, the pull-up node control circuit 14 may include a first pull-up control node control sub-circuit 141, a second pull-up control node control sub-circuit 142, a first pull-up node control sub-circuit 143, and a second pull-up node control sub-circuit 144, the first pull-up control node control sub-circuit 141 controls the potential of the first pull-up control node PUCN1, and the second pull-up control node control sub-circuit 142 controls the potential of the second pull-up control node PUCN2, the first pull-up node control sub-circuit 143 controls the potential of the pull-up node Q under the control of the first pull-up control node PUCN1, and the second pull-up node control sub-circuit 144 controls the potential of node pull-up node Q under the control of the second pull-up control node PUCN2.

Figure 3:
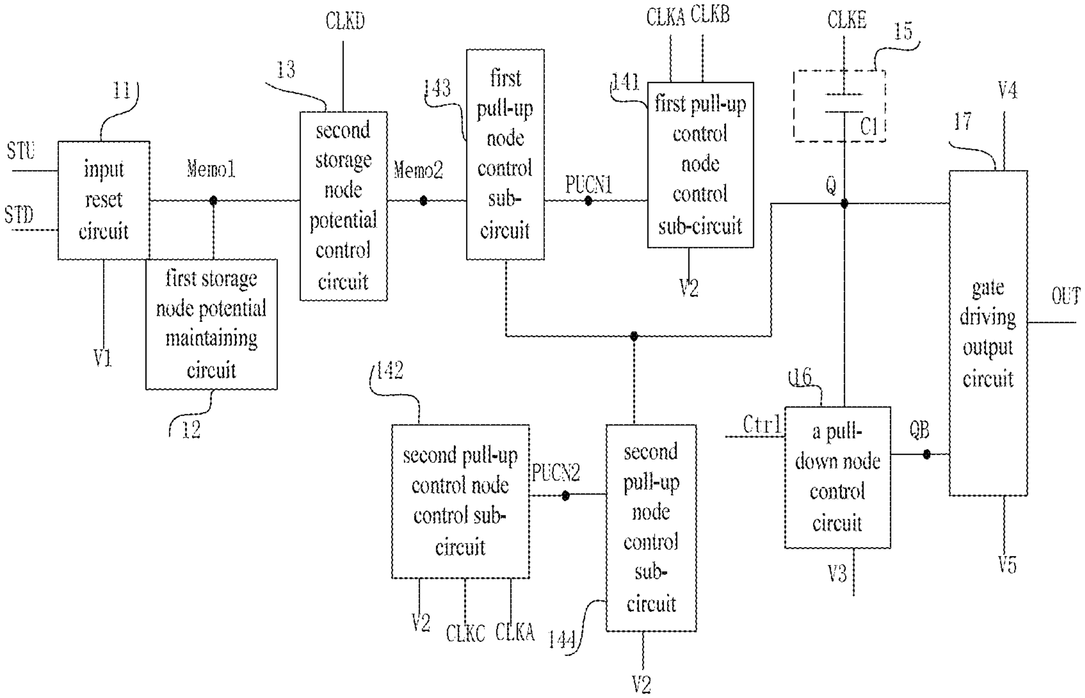
FIG. 3 is yet another schematic diagram of a shift register unit according to at least one embodiment of the present disclosure.

Specifically, as shown in FIG. 3, on the basis of the shift register unit shown in FIG. 2, the pull-up node potential maintaining circuit 15 may include: a first capacitor C1, a first end thereof being connected to a fifth clock signal input end CLKE, and a second end thereof being connected to the pull-up node Q. The shift register unit can lift up the potential of the pull-up node Q in a better way by using the first capacitor C1.

Figure 4:
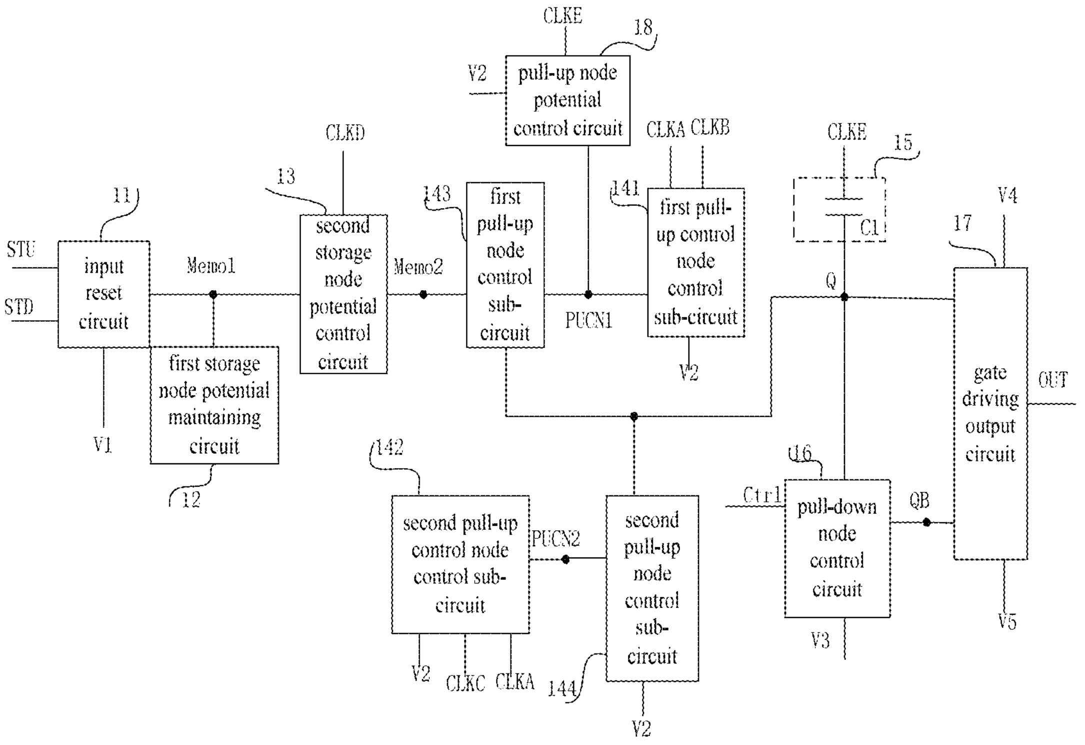
FIG. 4 is still yet another schematic diagram of a shift register unit according to at least one embodiment of the present disclosure.

Specifically, as shown in FIG. 4, on the basis of the shift register unit shown in FIG. 3, the shift register unit may further include: a pull-up node potential control circuit 18, connected to the fifth clock signal input end CLKE, the first pull-up control node PUCN1 and the second voltage input end, and configured to control to connect or disconnect the first pull-up control node PUCN1 and the second voltage input end under the control of the fifth clock signal input end CLKE.

The shift register unit shown in FIG. 4 adds a pull-up node potential control circuit 18 to control the potential of the first pull-up control node PUCN1 to control the potential of the pull-up node Q under the control of the fifth clock signal input end CLKE.

Specifically, the pull-up node potential control circuit may include: a pull-up node potential control transistor, a gate electrode thereof being connected to the fifth clock signal input end, a first electrode thereof being connected to the first pull-up control node, and a second electrode thereof being connected to the second voltage input end.

In actual operation, when the pull-up node potential control transistor is an n-type transistor, the second voltage is the first low voltage VGL1 and the fifth clock signal inputted by the fifth clock signal input end is a high voltage, the pull-up node potential control transistor is turned on to pull down the potential of the first pull-up control node PUCN1 to VGL1, and the gate electrode is disconnected from the transistor of the first pull-up control node, and at this time, if the potential of the second pull-up control node PUCN2 is a high voltage, the potential at the pull-up node Q can be pulled down.

Figure 5:
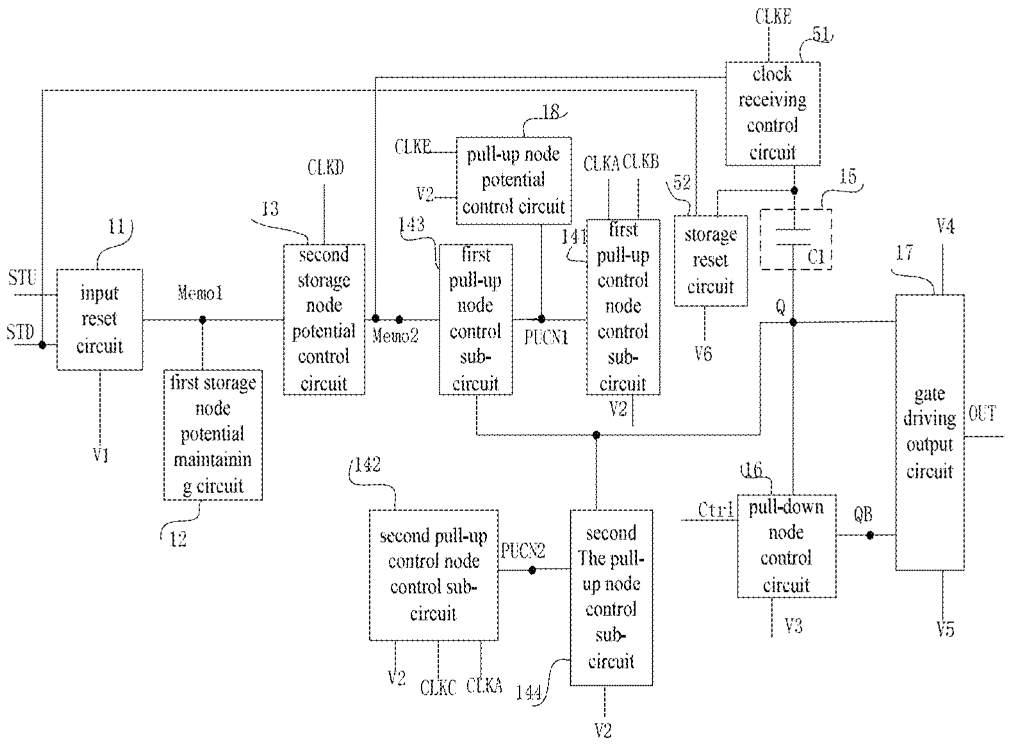
FIG. 5 is still yet another schematic diagram of a shift register unit according to at least one embodiment of the present disclosure.

Optionally, on the basis of the shift register unit shown in FIG. 4, as shown in FIG. 5, the shift register unit may further include a clock receiving control circuit 51 and a storage reset circuit 52. The first end of the first capacitor C1 is connected to the fifth clock signal input end CLKE through the clock receiving control circuit 51. The clock receiving control circuit 51 is further connected to the second storage node Memo2, and configured to control to connect or disconnect the first end of the first capacitor C1 and the fifth clock signal input end CLKE under the control of the second storage node Memo2. The storage reset circuit 52 is connected to the reset end STD, the first end of the first capacitor C1 and the sixth voltage input end, and configured to control to connect or disconnect the first end of the first capacitor C1 and the sixth voltage input end under the control of the reset end STD. The sixth voltage input end is configured to input a sixth voltage V6.

In actual operation, the sixth voltage V6 may be the first low voltage VGL1, but is not limited thereto.

The clock receiving control circuit 51 and the storage reset circuit 52 are added to the shift register unit shown in FIG. 5, so that the problem of the potential of the pull-up node Q in a non-display line being lifted twice and raised abnormally is solved.

According to some embodiments, the clock receiving control circuit may include a clock receiving control transistor; a gate electrode of the clock receiving control transistor is connected to the second storage node, and a first electrode of the clock receiving control transistor is connected to the fifth clock signal input end, and a second electrode of the clock receiving control transistor is connected to the first end of the first capacitor.

The storage reset circuit may include a storage reset transistor, the gate electrode of the storage reset transistor is connected to the reset end, a first electrode of the storage reset transistor is connected to a first end of the first capacitor, and the second electrode of the storage reset transistor is connected to the sixth voltage input end.

Figure 6:
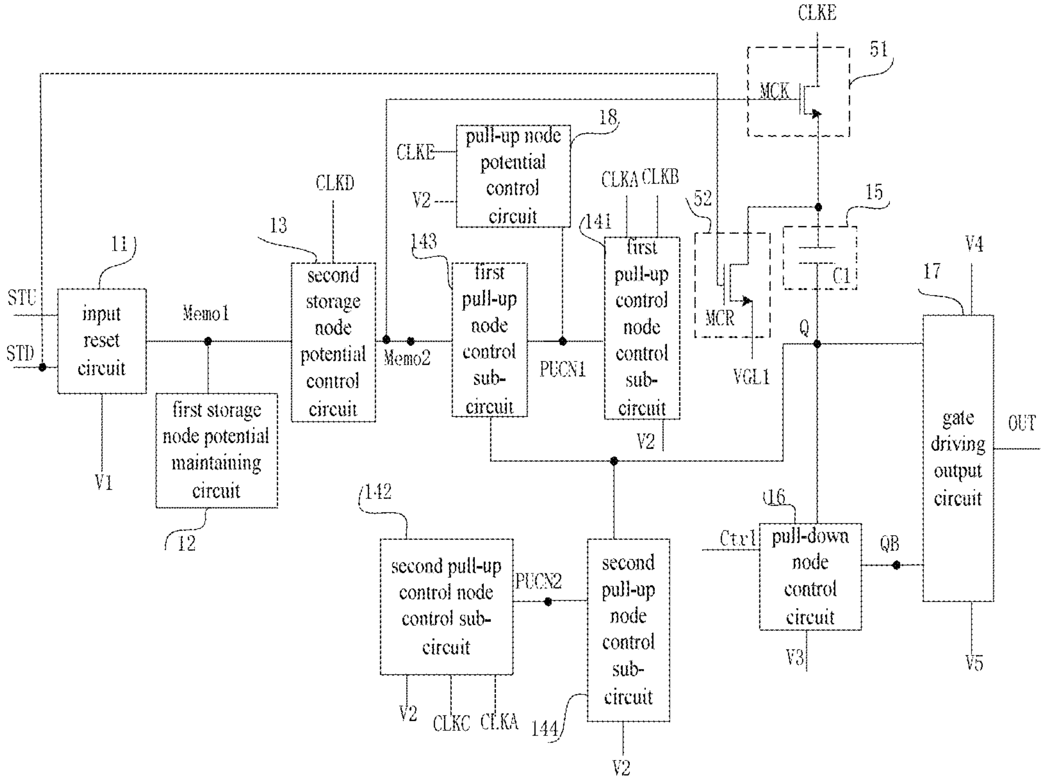
FIG. 6 still yet another schematic diagram of a shift register unit according to at least one embodiment of the present disclosure.

Specifically, on the basis of the embodiment shown in FIG. 5, as shown in FIG. 6, the clock receiving control circuit 51 includes a clock receiving control transistor MCK; the gate electrode of the clock receiving control transistor MCK is connected to the second storage node Memo2, the drain electrode of the clock receiving control transistor MCK is connected to the fifth clock signal input end CLKE, and the source electrode of the clock receiving control transistor MCK is connected to the first end of the first capacitor C1.

The storage reset circuit 52 includes a storage reset transistor MCR, the gate electrode of the storage reset transistor MCR is connected to the reset end STD, and a drain electrode of the storage reset transistor MCR is connected to a first end of the first capacitor C1. A source electrode of the storage reset transistor MCR is connected to the sixth voltage input end.

In the embodiment shown in FIG. 6, the sixth voltage input end is used to input the first low voltage VGL1.

In the embodiment shown in FIG. 6, the gate electrode of the MCK is controlled by the second storage node Memo2, and the MCK is turned on only when the shift register unit of the current row performs an operation (that is, the potential of Memo2 is a valid level). The potential of the pull-up node Q is raised by the pulse signal outputted by CLKE, and the potential of the pull-up node Q is reset under the control of the reset end STD, so that the potential of the pull-up node Q is in an absolute low level state during the non-display period.

Figure 7:
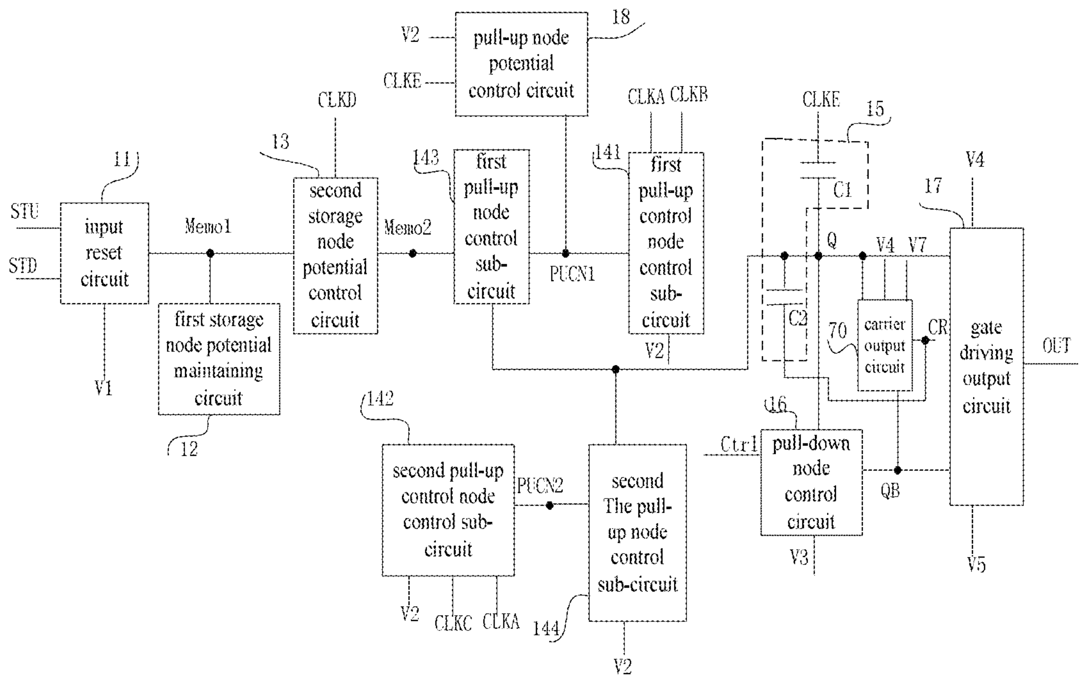
FIG. 7 is still yet another schematic diagram of a shift register unit according to at least one embodiment of the present disclosure.

Optionally, on the basis of the embodiment shown in FIG. 4, as shown in FIG. 7, the shift register unit further includes a carry signal output end CR and a carry output circuit 70.

The carry output circuit 70 is connected to the pull-up node Q, the pull-down node QB, the carry signal output end CR, the fourth voltage input end and the seventh voltage input end, configured to control to connect the carry signal output end CR and the fourth voltage input end when the potential of the pull-up node Q is a valid level, and control to connect the carry signal output end CR and the seventh voltage input end when the potential of the pull-down node QB is a valid level.

The carry signal output end CR is configured to provide a reset signal for a reset end included in the shift register unit of previous stage, and is configured to provide an input signal to an input end of the shift register unit of next stage.

The pull-up node potential maintaining circuit 15 further includes a second capacitor C2, the first end thereof being connected to the pull-up node Q, and the second end thereof being connected to the carry signal output end CR.

In the embodiment shown in FIG. 7, the fourth voltage input end can input a high voltage VGH, and the seventh voltage input end can input a first low voltage VGL1.

As shown in FIG. 7, a carry signal output end CR is added, and a reset signal is provided to the shift register unit of previous stage through the CR, and an input signal is provided to shift register unit of next stage through CR. The gate driving signal output end OUT directly drives the load so that the load capacity of the gate driving signal output end OUT does not decrease gradually during the transmission.

Specifically, the pull-down node control circuit may be configured to control a potential of the pull-down node to be a valid level under the control of the pull-down node control end, and control to connect or disconnect the pull-down node and the third voltage input end under the control of the pull-up node.

The gate driving output circuit may be configured to control to connect the gate driving signal output end and the fourth voltage input end when the potential of the pull-up node is a valid level, and control to connect the gate driving signal output end and the fifth voltage input end when the potential of the pull-down node is a valid level.

Specifically, the gate driving output circuit may include a first gate driving output transistor and a second gate driving output transistor. A gate electrode of the first gate driving output transistor is connected to the pull-up node, a first electrode of the first gate driving output transistor is connected to the fourth voltage input end, and a second electrode of the first gate driving output transistor is connected to the gate driving signal output end. A gate electrode of the second gate driving output transistor is connected to the pull-down node, a first electrode of the second gate driving output transistor is connected to the gate driving signal output end, and a second electrode of the second gate driving output transistor is connected to the fifth voltage input end.

The carry output circuit includes a first carry signal output transistor and a second carry signal output transistor. A gate electrode of the first carry signal output transistor is connected to the pull-up node, a first electrode of the first carry signal output transistor is connected to the fourth voltage input end, and a second electrode of the first carry signal output transistor is connected to the carry signal output end. A gate electrode of the second carry signal output transistor is connected to the pull-down node, a first electrode of the second carry signal output transistor is connected to the carry signal output end, and a second electrode of the second carry signal output transistor is connected to the seventh voltage input end.

Specifically, the first storage node potential maintaining circuit may include a third capacitor; the first end of the third capacitor is connected to the first storage node, and the second end of the third capacitor is connected to the first voltage input end. The second storage node potential control circuit may include a second storage node potential control transistor; a gate electrode of the second storage node potential control transistor is connected to the first storage node, and a first electrode of the second storage node potential control transistor is connected to the first clock signal input, and the second electrode of the second storage node potential control transistor is connected to the second storage node.

Specifically, the input reset circuit may include an input transistor and a reset transistor. A gate electrode of the input transistor and a first electrode of the input transistor are both connected to the input end, and a second electrode of the input transistor is connected to the first storage node. A gate electrode of the reset transistor is connected to the reset end, a first electrode of the reset transistor is connected to the first storage node, and a second electrode of the reset transistor is connected to the first voltage input end.

Specifically, the first pull-up node control sub-circuit may include a first control transistor and a second control transistor. A gate electrode of the first control transistor and a gate electrode of the second control transistor are both connected to the first pull-up control node, a first electrode of the first control transistor is connected to the second storage node, and a second electrode of the first control transistor is connected to a first electrode of the second control transistor, a second electrode of the second control transistor is connected to the pull-up node.

The first pull-up control node control sub-circuit may include a third control transistor, a fourth control transistor; a gate electrode of the third control transistor and a first electrode of the third control transistor are connected to the fourth clock signal input end, a second electrode of the third control transistor is connected to the first pull-up control node; a gate electrode of the fourth control transistor is connected to the third clock signal input end, the first electrode of the fourth control transistor is connected to the first pull-up control node, and a second electrode of the fourth control transistor is connected to the second voltage input end.

The second pull-up node control sub-circuit may include a fifth control transistor and a sixth control transistor; a gate electrode of the fifth control transistor and a gate electrode of the sixth control transistor are connected to the second pull-up control node, a first electrode of the fifth control transistor is connected to the pull-up node, a second electrode of the fifth control transistor is connected to a first electrode of the sixth control transistor, and a second electrode of the sixth control transistor is connected to the second voltage input end.

The second pull-up control node control sub-circuit may include a seventh control transistor and an eighth control transistor; a gate electrode of the seventh control transistor and a first electrode of the seventh control transistor are both connected to the third clock signal input end, a second electrode of the seventh control transistor is connected to the second pull-up control node; a gate electrode of the eighth control transistor is connected to the second clock signal input end, the first electrode of the eighth control transistor is connected to the second pull-up control node, and a second electrode of the eighth control transistor is connected to the second voltage input end.

Figure 8:
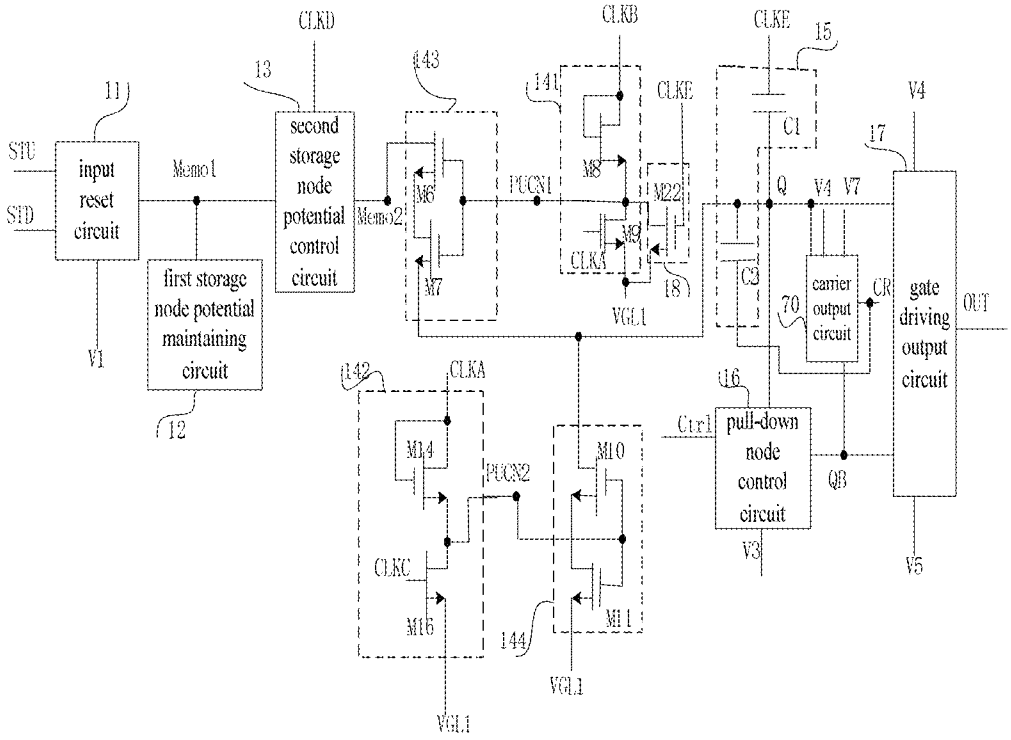
FIG. 8 is still yet another schematic diagram of a shift register unit according to at least one embodiment of the present disclosure.

On the basis of the embodiment shown in FIG. 7, as shown in FIG. 8, the first pull-up node control sub-circuit 143 includes a first control transistor M6 and a second control transistor M7.

The gate electrode of the first control transistor M6 and the gate electrode of the second control transistor M7 are both connected to the first pull-up control node PUCN1, the drain electrode of the first control transistor M6 is connected to the second storage node Memo2, a source electrode of the first control transistor M6 is connected to a drain electrode of the second control transistor M7, and a source electrode of the second control transistor M7 is connected to the pull-up node Q.

The first pull-up control node control sub-circuit 141 includes a third control transistor M8 and a fourth control transistor M9. The gate electrode of the third control transistor M8 and the drain electrode of the third control transistor M8 are both connected to the fourth clock signal input end CLKB, the source electrode of the third control transistor M8 is connected to the first pull-up control node PUCN1.

A gate electrode of the fourth control transistor M9 is connected to the third clock signal input end CLKA, and a drain electrode of the fourth control transistor M9 is connected to the first pull-up control node PUCN1, the source electrode of the fourth control transistor M9 is connected to the first low voltage VGL1.

The second pull-up node control sub-circuit 144 includes a fifth control transistor M10 and a sixth control transistor M11. A gate electrode of the fifth control transistor M10 and a gate electrode of the sixth control transistor M11 are connected to the second pull-up control node PUCN2, and a drain electrode of the fifth control transistor M10 is connected to the pull-up node Q, the source electrode of the fifth control transistor M10 is connected to the drain electrode of the sixth control transistor M11, the source electrode of the sixth control transistor M11 is connected to the first low voltage VGL1.

The second pull-up control node control sub-circuit 142 includes a seventh control transistor M14 and an eighth control transistor M16. The gate electrode of the seventh control transistor M14 and the drain electrode of the seventh control transistor M14 are both connected to the third clock signal input end CLKA, and the source electrode of the seventh control transistor M14 is connected to the second pull-up control node PUCN2. A gate electrode of the eighth control transistor M16 is connected to the second clock signal input end CLKC, and a drain electrode of the eighth control transistor M16 is connected to the second pull-up control node PUCN2, a source electrode of the eighth control transistor M16 is connected to the first low voltage VGL1.

In the embodiment shown in FIG. 8, each transistor is an n-type transistor. However, in actual operation, the transistor may be a p-type transistor, and the type of the transistor is not limited herein.

In a specific implementation, the third clock signal inputted by the CLKA and the fourth clock signal inputted by the CLKB are high frequency clock signals having opposite phases, and the fifth clock signal inputted by the CLKE is delayed by a predetermined time from the second clock signal inputted by the CLKC.

As shown in FIG. 8, when both CLKC and CLKE input a low level, the potential of PUCN2 is at a high level, and M10 and M11 are turned on, so that the potential of the pull-up node Q is pulled down. When CLKC inputs a high level and CLKE inputs a low level, the potential of PUCN2 is at a low level; M10 and M11 are turned off. When CLKB inputs a high level, the potential of PUCN1 is set to be a high level, and both M6 and M7 are turned on, so as to deliver the high potential of Memo2 to the pull-up node Q, so that the potential of the pull-up node Q becomes a high level. When both CLKC and CLKE input a high level, M22 is turned on, then the potential of PUCN1 is pulled down, and the potential of the pull-up node Q is pulled up by C1 and C2 together, so that the potential of the pull-up node Q is maintained at a high level. After the second clock signal inputted by CLKC transitions from a high level to a low level, the potential of PUCN2 is pulled up to a high level again by M14, then M10 and M11 are turned on, so as to pull the potential of the pull-up node Q down.

Optionally, the shift register unit of some embodiments of the present disclosure may further include a leakage eliminating circuit. The leakage eliminating circuit is connected to the carry signal output end, the gate driving signal output end, and the second electrode of the first control transistor and a second electrode of the fifth control transistor, and configured to control to connect or disconnect the gate driving signal output end and the second electrode of the first control transistor under the control of the carry signal output end, and control do connect or disconnect the gate driving signal output end and the second electrode of the fifth control transistor.

The shift register unit of some embodiments of the present disclosure adds a leakage eliminating circuit, and when a valid level is outputted by the carry signal output end, the source electrode of M6 and the source electrode of the M10 are both connected to a high voltage, thereby reducing the gate-source voltage of M6 and the gate-to-source voltage of M10, and reducing the leakage current of M6 and the leakage current of M10, so that the leakage current of the oxide transistor can be reduced by potential feedback.

Specifically, the leakage eliminating circuit may include a leakage eliminating transistor; a gate electrode of the leakage eliminating transistor is connected to the carry signal output end, and a first electrode of the leakage eliminating transistor is connected to a second electrode of the first control transistor and the second electrode of the fifth control transistor, and the second electrode of the leakage eliminating transistor is connected to the gate driving signal output end.

Figure 9:
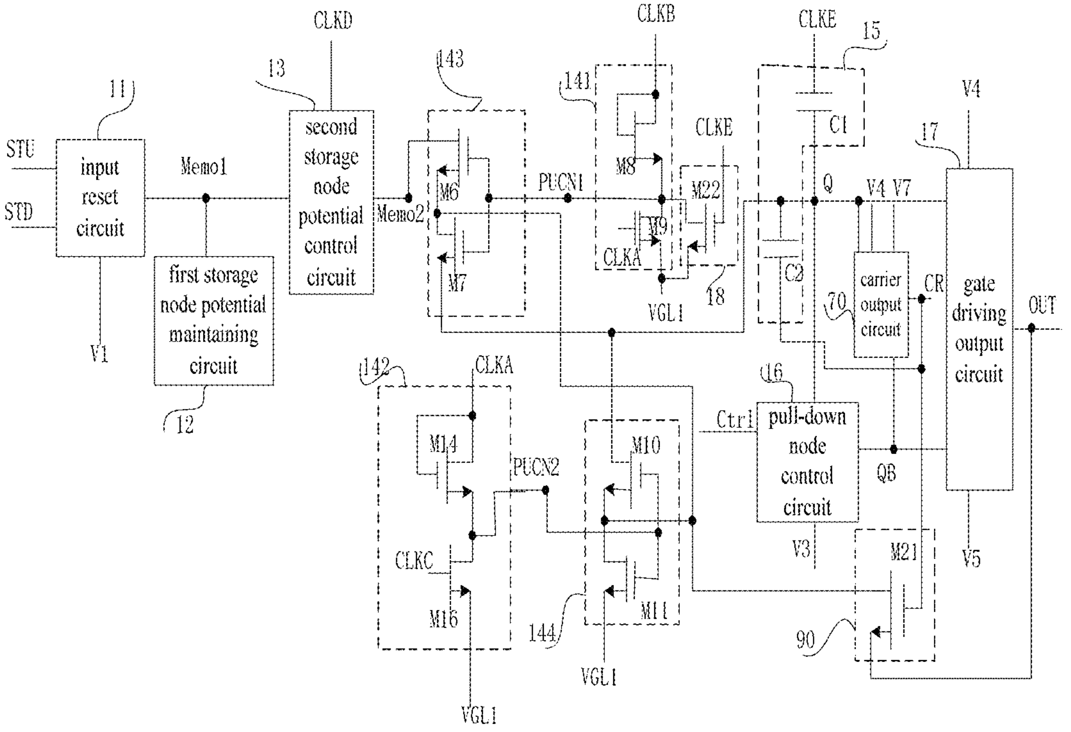
FIG. 9 still yet another schematic diagram of a shift register unit according to at least one embodiment of the present disclosure.

As shown in FIG. 9, on the basis of the shift register unit shown in FIG. 8, the shift register unit further includes a leakage eliminating circuit 90. The leakage eliminating circuit 90 includes a leakage eliminating transistor M21. A gate electrode of the leakage eliminating transistor M21 is connected to the carry signal output end CR, and a drain electrode of the leakage eliminating transistor M21 is connected to a source electrode of the first control transistor M6 and a source electrode of the fifth control transistor M10. The source electrode of the leakage eliminating transistor M21 is connected to the gate driving signal output end OUT.

In the embodiment shown in FIG. 9, M21 is an n-type transistor, but is not limited thereto.

As shown in FIG. 9, when both CR and OUT output a high level, M21 is turned on to control the source electrode of M6 and the source electrode of M10 to be connected to a high voltage, thereby reducing the gate-source voltage of M6 and the gate-source voltage of M10, and reducing electric leakage.

Optionally, the pull-down node control end may include a third clock signal input end and a fourth clock signal input end.

The pull-down node control circuit may include a first pull-down node control transistor, a second pull-down node control transistor, and a third pull-down node control transistor. The gate electrode of the first pull-down node control transistor and the drain electrode of the first pull-down node control transistor are both connected to the third clock signal input end, and the source electrode of the first pull-down node controls transistor is connected to the pull-down node. The gate electrode of the second pull-down node control transistor and the drain electrode of the second pull-down node control transistor are both connected to the fourth clock signal input end, and the source electrode of the second pull-down node transistor M13 is connected to the pull-down node. The gate electrode of the third pull-down node control transistor is connected to the pull-up node, the drain electrode of the third pull-down node control transistor is connected to the pull-down node, and the source electrode of the third pull-down node control transistor of the transistor is connected to the third voltage input end. The third clock signal input end is configured to input a third clock signal, and the fourth clock signal input end is configured to input a fourth clock signal, and the third clock signal is inverted from the fourth clock signal.

The third clock signal inputted by the third clock signal input end and a fourth clock signal inputted by the fourth clock signal input end are high frequency clock signals having opposite phases, such that the first pull-down node control transistor and the second pull-down node control transistor are turned on in a time-division manner, so as to pull up the potential of the pull-down node, thereby preventing characteristics deterioration of a transistor controlled by a single potential.

Figure 10:
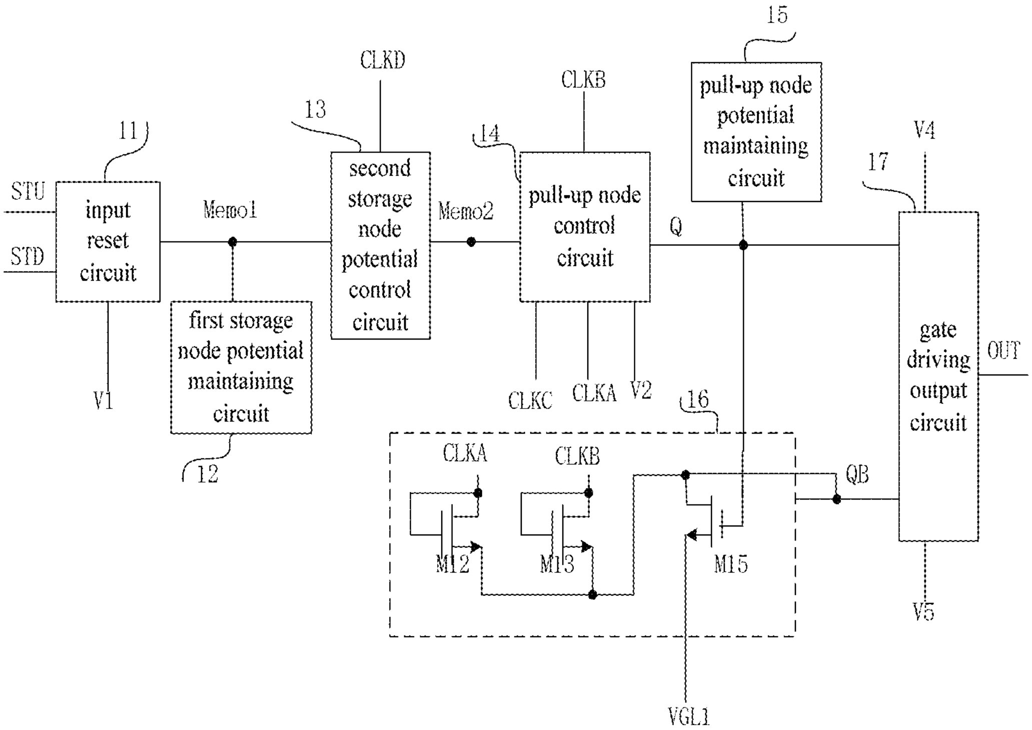
FIG. 10 is still yet another schematic diagram of a shift register unit according to at least one embodiment of the present disclosure.

As shown in FIG. 10, on the basis of the shift register unit shown in FIG. 1, the pull-down node control end includes a third clock signal input end CLKA and a fourth clock signal input end CLKB. The pull-down node control circuit 16 includes a first pull-down node control transistor M12, a second pull-down node control transistor M13 and a third pull-down node control transistor M15.

The gate electrode of the first pull-down node control transistor M12 and the drain electrode of the first pull-down node control transistor M12 are both connected to the third clock signal input end CLKA, and the source electrode of the first pull-down node control transistor M12 is connected to the pull-down node QB. The gate electrode of the second pull-down node control transistor M13 and the drain electrode of the second pull-down node control transistor M13 are both connected to the fourth clock signal input end CLKB, and the source electrode of the second pull-down node control transistor M13 is connected to the pulldown node QB. The gate electrode of the third pull-down node control transistor M15 is connected to the pull-up node Q, the drain electrode of the third pull-down node control transistor M15 is connected to the pull-down node QB, and the source electrode of the third pull-down node control transistor M15 is connected to the first low voltage VGL1. The third clock signal input end CLKA is used to input a third clock signal, and the fourth clock signal input end CLKB is used to input a fourth clock signal, and the third clock signal and the fourth clock signal are inverted.

The third clock signal and the fourth clock signal are high frequency clock signals having opposite phases, such that M12 and M13 are turned on in a time-division manner to pull up the potential of the pull-down node QB, thereby preventing characteristics deterioration of a transistor controlled by a single potential.

Specifically, the shift register unit may further include a storage node reset circuit, connected to the reset control end, the first storage node, the second storage node, and the eighth voltage input end, and configured to control the first storage node and the second storage node to be both connected to the eighth voltage input end under the control of the reset control end.

In a specific implementation, the eighth voltage input end can input the first low voltage VGL1, but is not limited thereto.

Figure 11:
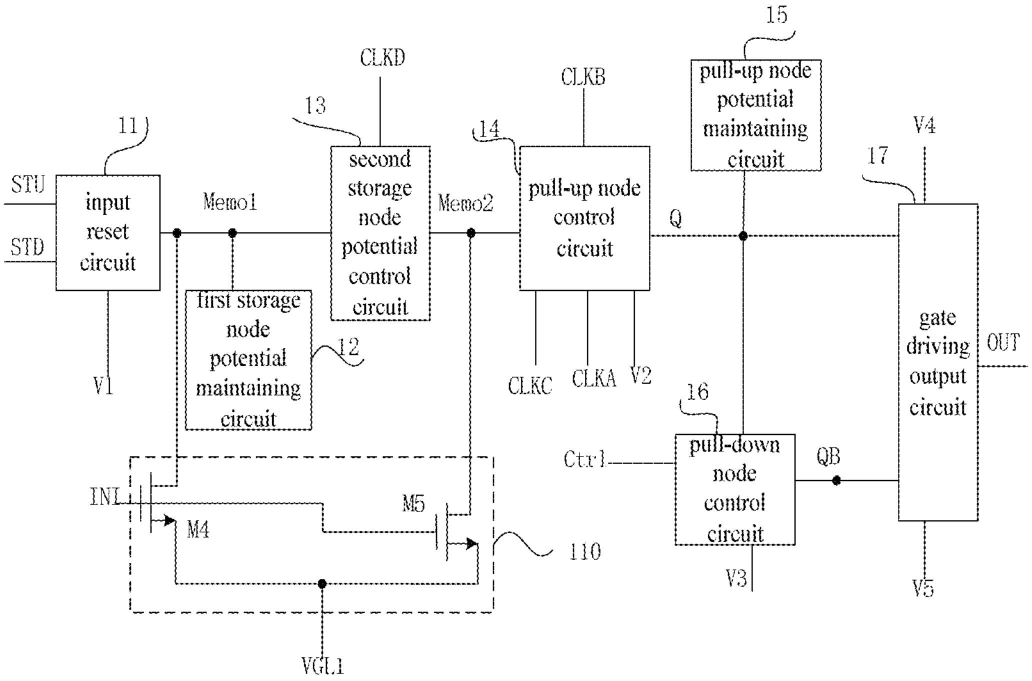
FIG. 11 is still yet another schematic diagram of a shift register unit according to at least one embodiment of the present disclosure.

As shown in FIG. 11, on the basis of the embodiment of the shift register unit shown in FIG. 1, the shift register unit further includes a storage node reset circuit 110. The storage node reset circuit 110 includes a first storage node reset transistor M4 and a second storage node reset transistor M5. The gate electrode of M4 and the gate electrode of M5 are both connected to the reset control end INI, the drain electrode of M4 is connected to the first storage node Memo1, the drain electrode of M5 is connected to the second storage node Memo2, the source electrode of M4 and the source electrode of M5 are both connected to the first low voltage VGL1.

In the embodiment of FIG. 11, both M4 and M5 are n-type transistors, but are not limited thereto.

When INI outputs a high level, both M4 and M5 are turned on, so that the potential of Memo1 and the potential of Memo2 are reset to VGL1.

In a specific implementation, the shift register unit may further include a pull-up node reset circuit and a pull-down node reset circuit. The pull-up node reset circuit includes a pull-up node reset transistor, and the pull-down node reset circuit includes a pull-down node reset transistor. The gate electrode of the pull-up node reset transistor and the gate electrode of the pull-down node reset transistor are both connected to the reset enable end, the first electrode of the pull-up node reset transistor is connected to the pull-up node, and the first electrode of the pull-down node reset transistor is connected to the pull-down node, the second electrode of the pull-up node reset transistor and the second electrode of the pull-down node reset transistor are both connected to a first low voltage; the pull-up node reset transistor and the pull-down node reset transistor are turned on under the control of the reset enable end for a predetermined period of time, so as to reset the potential of the pull-up node and the potential of the pull-down node.

The shift register unit of the present disclosure will be described below by three specific embodiments.

Figure 12:
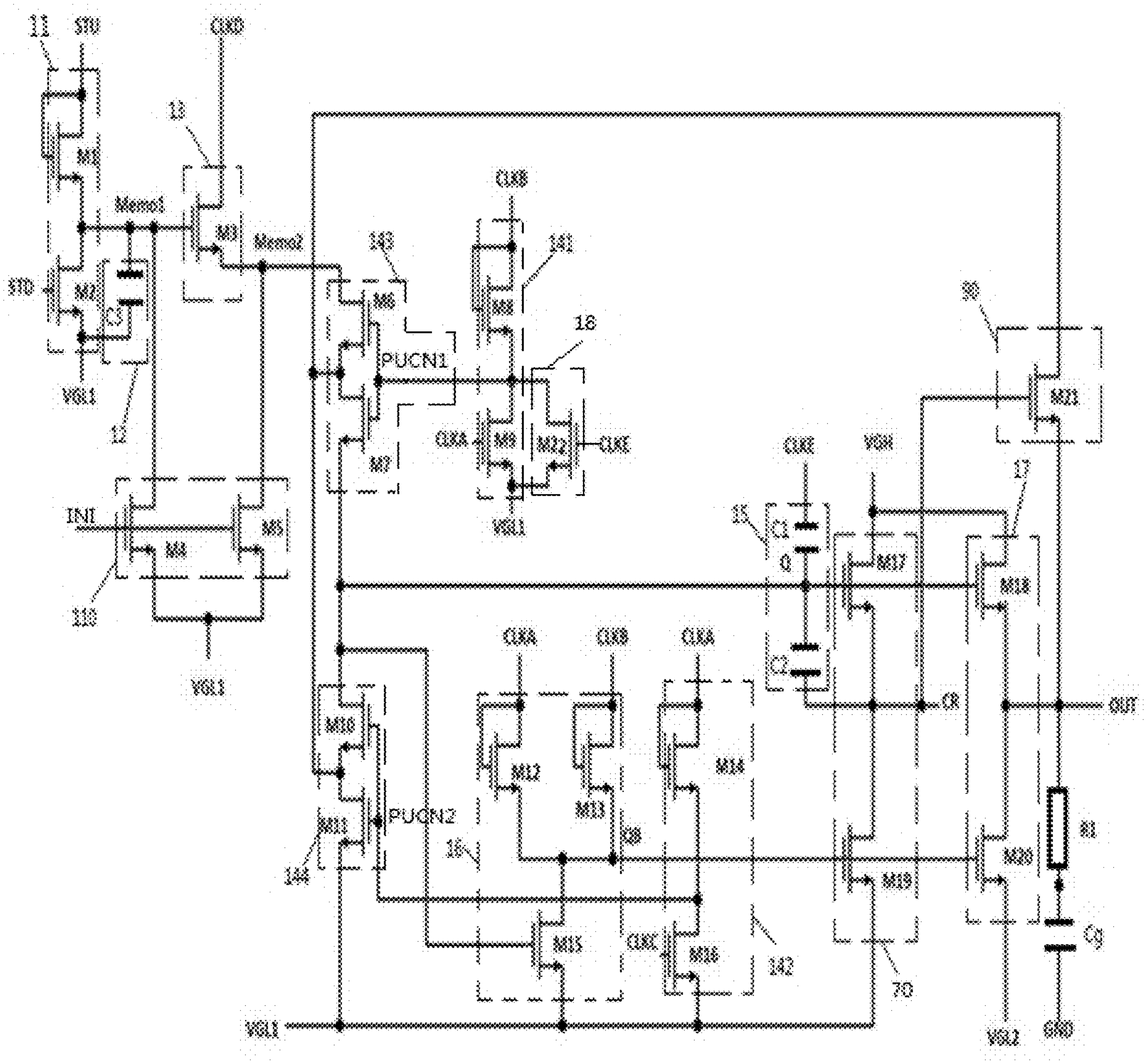
FIG. 12 is a circuit diagram of a shift register unit according to the first embodiment of the present disclosure.

As shown in FIG. 12, according to a first embodiment of the present disclosure, the shift register unit includes an input end STU, a reset end STD, a gate driving signal output end OUT, and a carry signal output end CR; the shift register unit further includes an input reset circuit 11, a first storage node potential maintaining circuit 12, a second storage node potential control circuit 13, a pull-up node control circuit 14, a pull-up node potential maintaining circuit 15, a pull-down node control circuit 16, and a gate driving output circuit 17, the pull-up node potential control circuit 18, the carry output circuit 70, the leakage eliminating circuit 90 and the storage node reset circuit 110.

The pull-up node control circuit 14 includes a first pull-up control node control sub-circuit 141, a second pull-up control node control sub-circuit 142, a first pull-up node control sub-circuit 143, and a second pull-up node control sub-circuit 144.

The input reset circuit 11 includes an input transistor M1 and a reset transistor M2. The gate electrode of the input transistor M1 and the drain electrode of the input transistor M1 are both connected to the input end STU, and the source electrode of the input transistor M1 is connected to the first storage node Memo1. The gate electrode of the reset transistor M2 is connected to the reset end STD, the drain electrode of the reset transistor M2 is connected to the first storage node Memo1, the source electrode of the reset transistor M2 is connected to the first low voltage VGL1.

The first storage node potential maintaining circuit 12 includes a third capacitor C3; the first end of the third capacitor C3 is connected to the first storage node Memo1, and the second end of the third capacitor C3 is connected to the first low voltage VGL1.

The second storage node potential control circuit 13 includes a second storage node potential control transistor M3. A gate electrode of the second storage node potential control transistor M3 is connected to the first storage node Memo1, and a drain electrode of the second storage node potential control transistor M3 is connected to the first clock signal input end CLKD, a source electrode of the second storage node potential control transistor M3 is connected to the second storage node Memo2.

The first pull-up node control sub-circuit 143 includes a first control transistor M6 and a second control transistor M7. The gate electrode of the first control transistor M6 and the gate electrode of the second control transistor M7 are both connected to the first pull-up control node PUCN1, the drain electrode of the first control transistor M6 is connected to the second storage node Memo2, a source electrode of the first control transistor M6 is connected to a drain electrode of the second control transistor M7, and a source electrode of the second control transistor M7 is connected to the pull-up node Q.

The first pull-up control node control sub-circuit 141 includes a third control transistor M8 and a fourth control transistor M9. The gate electrode of the third control transistor M8 and the drain electrode of the third control transistor M8 are both connected to the fourth clock signal input end CLKB, the source electrode of the third control transistor M8 is connected to the first pull-up control node PUCN1. A gate electrode of the fourth control transistor M9 is connected to the third clock signal input end CLKA, and a drain electrode of the fourth control transistor M9 is connected to the first pull-up control node PUCN1, a source electrode of the fourth control transistor M9 is connected to the first low voltage VGL1.

The second pull-up node control sub-circuit 144 includes a fifth control transistor M10 and a sixth control transistor M11. A gate electrode of the fifth control transistor M10 and a gate electrode of the sixth control transistor M11 are connected to the second pull-up control node PUCN2, and a drain electrode of the fifth control transistor M10 is connected to the pull-up node Q, a source electrode of the fifth control transistor M10 is connected to the drain electrode of the sixth control transistor M11, the source electrode of the sixth control transistor M11 is connected to the first low voltage VGL1.

The second pull-up control node control sub-circuit 142 includes a seventh control transistor M14 and an eighth control transistor M16. The gate electrode of the seventh control transistor M14 and the drain electrode of the seventh control transistor M14 are both connected to the third clock signal input end CLKA, and the source electrode of the seventh control transistor M14 is connected to the second pull-up control node PUCN2. A gate electrode of the eighth control transistor M16 is connected to the second clock signal input end CLKC, and a drain electrode of the eighth control transistor M16 is connected to the second pull-up control node PUCN2, a source electrode of the eighth control transistor M16 is connected to the first low voltage VGL1.

The pull-up node potential maintaining circuit 15 includes a first capacitor C1 and a second capacitor C2. The first end of the first capacitor C1 is connected to the fifth clock signal input end CLKE, and the second end of the first capacitor C1 is connected to the pull-up node Q. The first end of the second capacitor C2 is connected to the pull-up node Q, and the second end of the second capacitor C2 is connected to the carry signal output end CR.

The pull-down node control circuit 16 includes a first pull-down node control transistor M12, a second pull-down node control transistor M13 and a third pull-down node control transistor M15. The gate electrode of the first pull-down node control transistor M12 and the drain electrode of the first pull-down node control transistor M12 are both connected to the third clock signal input end CLKA, and the source electrode of the first pull-down node control transistor M12 is connected to the pulldown node QB.

The gate electrode of the second pull-down node control transistor M13 and the drain electrode of the second pull-down node control transistor M13 are both connected to the fourth clock signal input end CLKB, and the source electrode of the second pull-down node control transistor M13 is connected to the pulldown node QB. The gate electrode of the third pull-down node control transistor M15 is connected to the pull-up node Q, the drain electrode of the third pull-down node control transistor M15 is connected to the pull-down node QB, and the source electrode of the third pull-down node control transistor M15 is connected to the first low voltage VGL1.

The gate driving output circuit 17 includes a first gate driving output transistor M18 and a second gate driving output transistor M20. A gate electrode of the first gate driving output transistor M18 is connected to the pull-up node Q, a drain electrode of the first gate driving output transistor M18 is connected to a high voltage VGH, and a source electrode of the first gate drive output transistor M18 is connected to the gate driving signal output end OUT. A gate electrode of the second gate driving output transistor M20 is connected to the pull-down node QB, and a drain electrode of the second gate driving output transistor M20 is connected to the gate driving signal output end OUT, the source electrode of the second gate driving output transistor M20 is connected to the second low voltage VGL2.

The carry output circuit 70 includes a first carry signal output transistor M17 and a second carry signal output transistor M19. A gate electrode of the first carry signal output transistor M17 is connected to the pull-up node Q, a drain electrode of the first carry signal output transistor M17 is connected to a high voltage VGH, and a source electrode of the first carry signal output transistor M17 is connected to the carry signal output end CR. A gate electrode of the second carry signal output transistor M19 is connected to the pull-down node QB, a drain electrode of the second carry signal output transistor M19 is connected to the carry signal output end CR, and the source electrode of the second carry signal output transistor M19 is connected to the first low voltage VGL1.

The pull-up node potential control circuit 18 includes: a pull-up node potential control transistor M22, a gate electrode thereof being connected to the fifth clock signal input end CLKE, a drain electrode thereof being connected to the first pull-up control node PUCN1, and a source electrode thereof being connected to the first low voltage VGL1.

The leakage eliminating circuit 90 includes a leakage eliminating transistor M21. A gate electrode of the leakage eliminating transistor M21 is connected to the carry signal output end CR, and a drain electrode of the leakage eliminating transistor M21 is connected to a source electrode of the first control transistor M6 and a source electrode of the fifth control transistor M10. The source electrode of the leakage eliminating transistor M21 is connected to the gate driving signal output end OUT.

The storage node reset circuit 110 includes a first storage node reset transistor M4 and a second storage node reset transistor M5. The gate electrode of M4 and the gate electrode of M5 are both connected to the reset control end INI, the drain electrode of M4 is connected to the first storage node Memo1, the drain electrode of M5 is connected to the second storage node Memo2, the source electrode of M4 and the source electrode of M5 are both connected to the first low voltage VGL1.

The third clock signal inputted by the CLKA and the fourth clock signal inputted by the CLKB are inverted, and the third clock signal and the fourth clock signal are high frequency clock signals.

In FIG. 12, the first resistor is denoted by R1, the parasitic capacitor is denoted by Cg, and the ground is denoted by GND.

In the first embodiment of the shift register unit shown in FIG. 12, all of the transistors are n-type transistors, but are not limited thereto.

Figure 13:
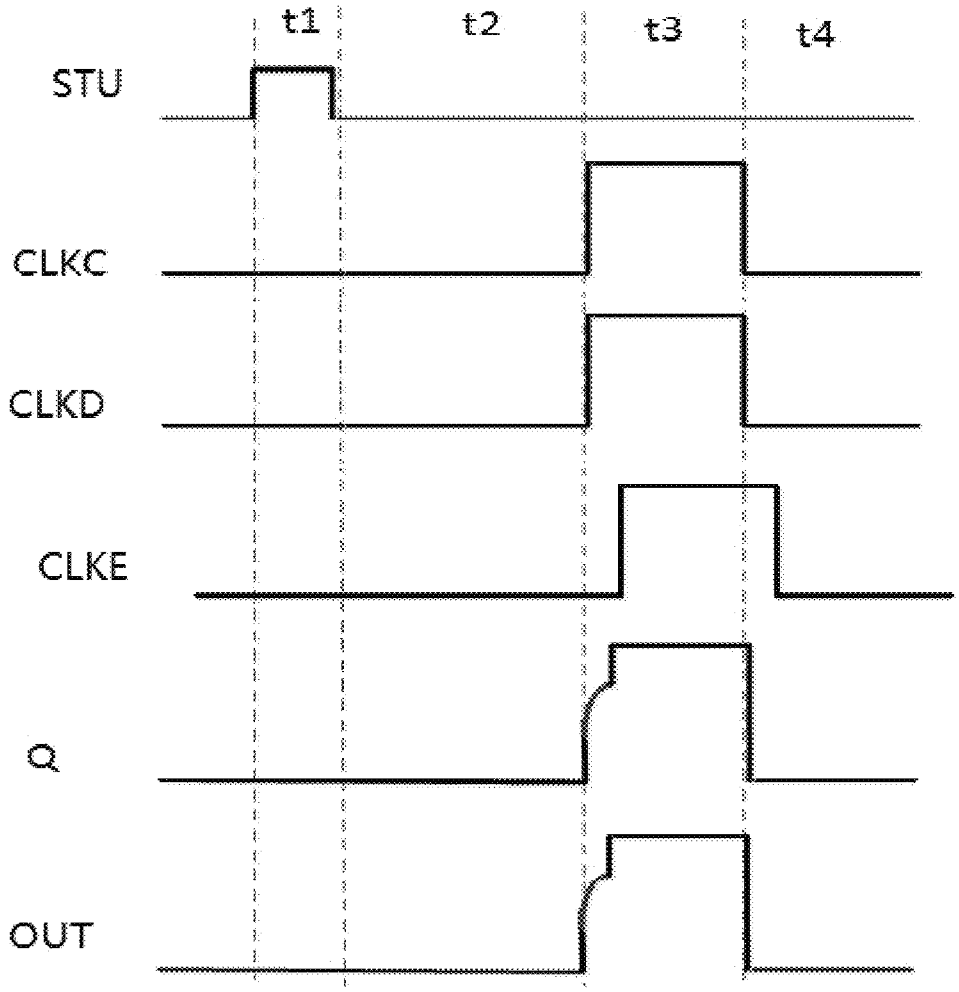
FIG. 13 is a time sequence diagram of a shift register unit according to the first embodiment of the present disclosure.

As shown in FIG. 13, the shift register unit shown in FIG. 12 is in operation.

In the input phase t1, STU outputs a high level, STD outputs a low level, CLKC, CLKD and CLKE all input a low level, CLKA inputs a high level and a low level alternately, CLKB inputs a low level and a high level alternately, M1 is turned on to control the connection between Memo1 and STU, and C3 controls to maintain the high potential of the first storage node Memo1, so that M3 is turned on to control the connection between Memo2 and CLKD, thereby the potential of Memo2 being a low level; CLKA and CLKB alternately input a high level, so that M12 and M13 are turned on alternately, the potential of QB becomes a high level, both M19 and M20 are turned on, and both OUT and CR output a low level; and CLKA controls to turn on M14 and turn off M16 alternately, so that the potential of PUCN2 is pulled up to be a high level, thereby turning on M10 and M11, pulling the potential of Q down to a low level.

In the maintaining phase t2, STU, STD, CLKC, CLKD, and CLKE all input a low level, CLKA input a high level and a low level alternately, CLKB inputs a low level and a high level alternately, M1 is turned off, and the potential of Memo1 is maintained at a high level by C3, M3 is turned on, the potential of Memo2 is maintained at a low level, and CLKA and CLKB alternately input a high level, so that M12 and M13 are turned on alternately, so that the potential of QB becomes a high level, thereby turning on M19 and M20, and OUT and CR both output a low level.

In the output stage t3, both STU and STD output a low level, CLKC and CLKD both output a high level, and CLKE is delayed by a predetermined time t to CLKC. At this time, both M1 and M2 are turned off, and the potential of Memo1 is maintained at a high level by C3. M3 is turned on to pull the potential of Memo2 up to a high level; M16 is turned on under the control of CLKC, thereby pulling the potential of PUCN2 down to a low level, so that M10 and M11 are turned off. When CLKE has not output high level yet, CLKB controls to pull up the potential of PUCN1 to a high level such that M6 and M7 are turned on, and the high potential of Memo2 is delivered to the pull-up node Q until the CLKE outputs a high level, M22 is turned on to pull the potential of PUCN1 down to a low level, M6 and M7 are turned off, and then by the potential of pull-up node Q is pulled up by bootstrap of C1 and C2, M18 and M17 are turned on, OUT and CR both output a high voltage, so that M21 is turned on, the high voltage is outputted to the source electrode of M6 and the source electrode of M10, so that the gate-source voltage of M6 and the gate-source voltage of M7 are reduced to reduce electric leakage; and OUT directly drives the load, CR provides an input signal for the next stage, and CR provides a reset signal for the previous stage, so that the load capacity of OUT does not gradually decrease line by line; and in the output stage t3, M15 is turned on to pull the potential of QB down to a low level.

In the reset phase t4, the STU outputs a low level, the STD outputs a high level, and both CLKC and CLKD both output a low level. The fifth clock signal inputted by CLKE is delayed by a predetermined time to the second clock signal inputted by the CLKC, and M1 is turned off, M2 is turned on, the potential of Memo1 is pulled down, M3 is turned off; when CLKC outputs a low level, the potential of PUCN2 is pulled up to a high level, M10 and M11 are turned on to pull the potential of Q down to a low level; M12 and M13 are turned on by CLKA, CLKB, so as to pull the potential of QB up to a high level, both OUT and CR output a low voltage.

In the first embodiment of the shift register unit of the present disclosure, when CLKD inputs a high level, CLKC also outputs a high level, and OUT outputs a high level; the shift register unit can control the pulse modulation of the gate driving signal by controlling the first clock signal inputted by the CLKD and the second clock signal inputted by the CLKC, and the pulse width of the gate driving signal can be adjustable.

In a specific implementation, during the time period of CLKD inputting a high level, if CLKC inputs a double pulse clock signal, OUT outputs a double pulse gate driving signal. In actual operation, the fifth clock signal inputted by CLKE input is delayed by a predetermined time to the second clock signal.

In the first embodiment of the shift register unit of the present disclosure, VGL2 is a negative value greater than VGL1, so that even if M20 is negatively biased after a long period of operation, since the gate-source voltage of M20 is negative, OUT will not output an abnormal signal.

In the first embodiment of the shift register unit of the present disclosure, M12 and M13 are turned on at intervals under the control of CLKA, CLKB. As compared with the prior art that a transistor controlled by a DC voltage is used to control the potential of the pull-down node QB, it is possible to avoid the problem that the transistor characteristics are deteriorated due to being turned on for a long time.

In the shift register unit of the first embodiment of the present disclosure, when C3, M1, and M2 are used to store the pulse signal inputted by the shift register unit of the previous stage, and the signal is stored in C3.

In the shift register unit, the width to length ratio of M17 is smaller than the width to length ratio of M18. The width to length ratio of M17 is small, which facilitates lossless transmission of signals; the width to length ratio of M18 is large, which facilitates driving a large load.

In the shift register unit of a first embodiment of the present disclosure, the high level of the carry signal outputted by CR and the high level of the gate driving signal outputted by OUT are controlled by VGH, and the front end signal is required to enable the potential of Q to reach a predetermined potential, and the attenuation of the output signal is small.

In the shift register unit of the first embodiment of the present disclosure, in order to prevent the potential of Q from being too low due to insufficient bootstrap of C2, C1 is added to perform secondary bootstrap to fully improve the potential of Q, so that the output voltage has no loss.

In the shift register unit of the first embodiment of the present disclosure, M4 and M5 are used to reset the potential of Memo1 and the potential of Memo2 to eliminate residual charge.

Figure 14:
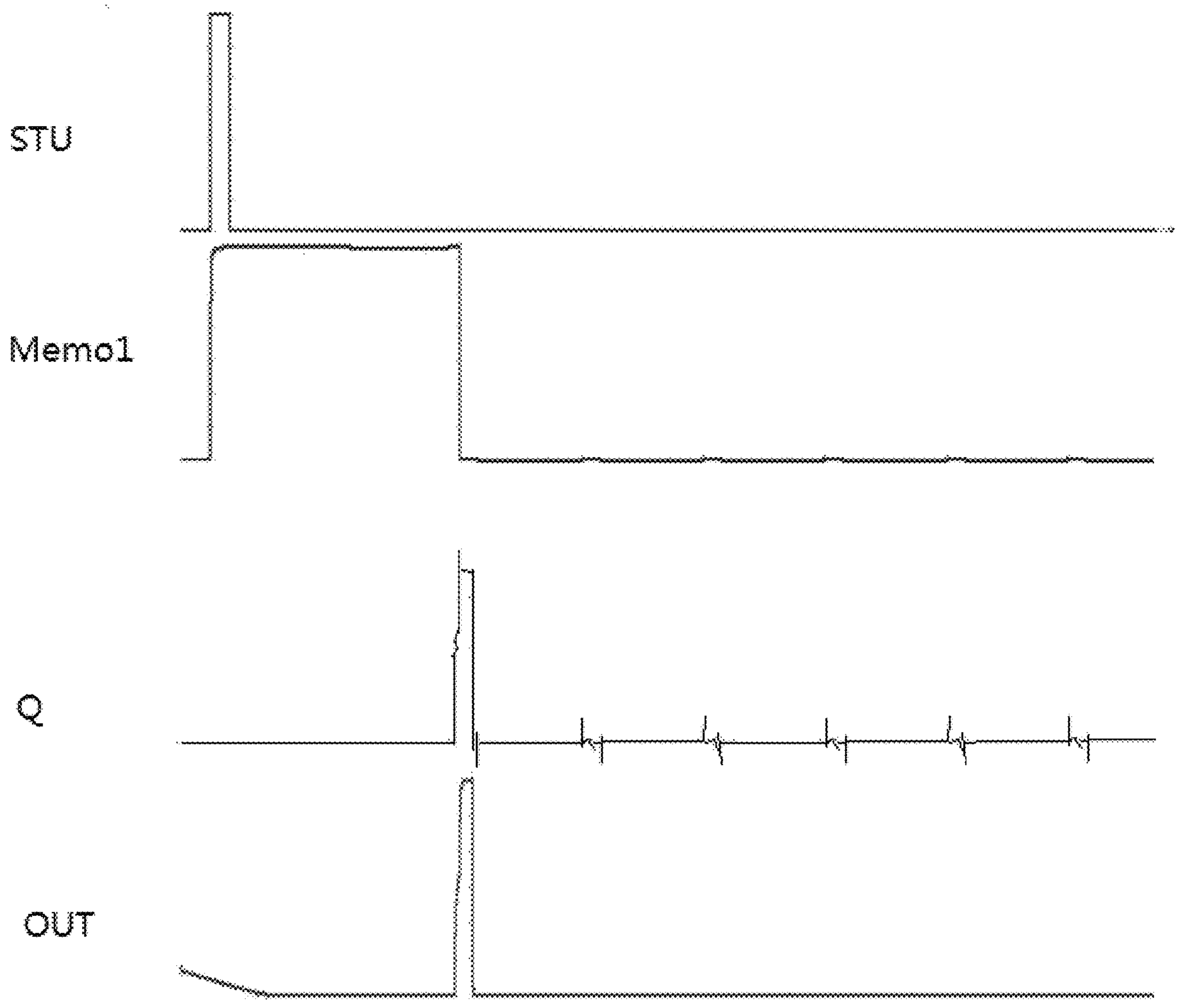
FIG. 14 is a simulation result of a shift register unit according to the first embodiment of the present disclosure.

FIG. 14 is a simulation result of the shift register unit shown in FIG. 12 according to a first embodiment of the present disclosure.

Figure 15:
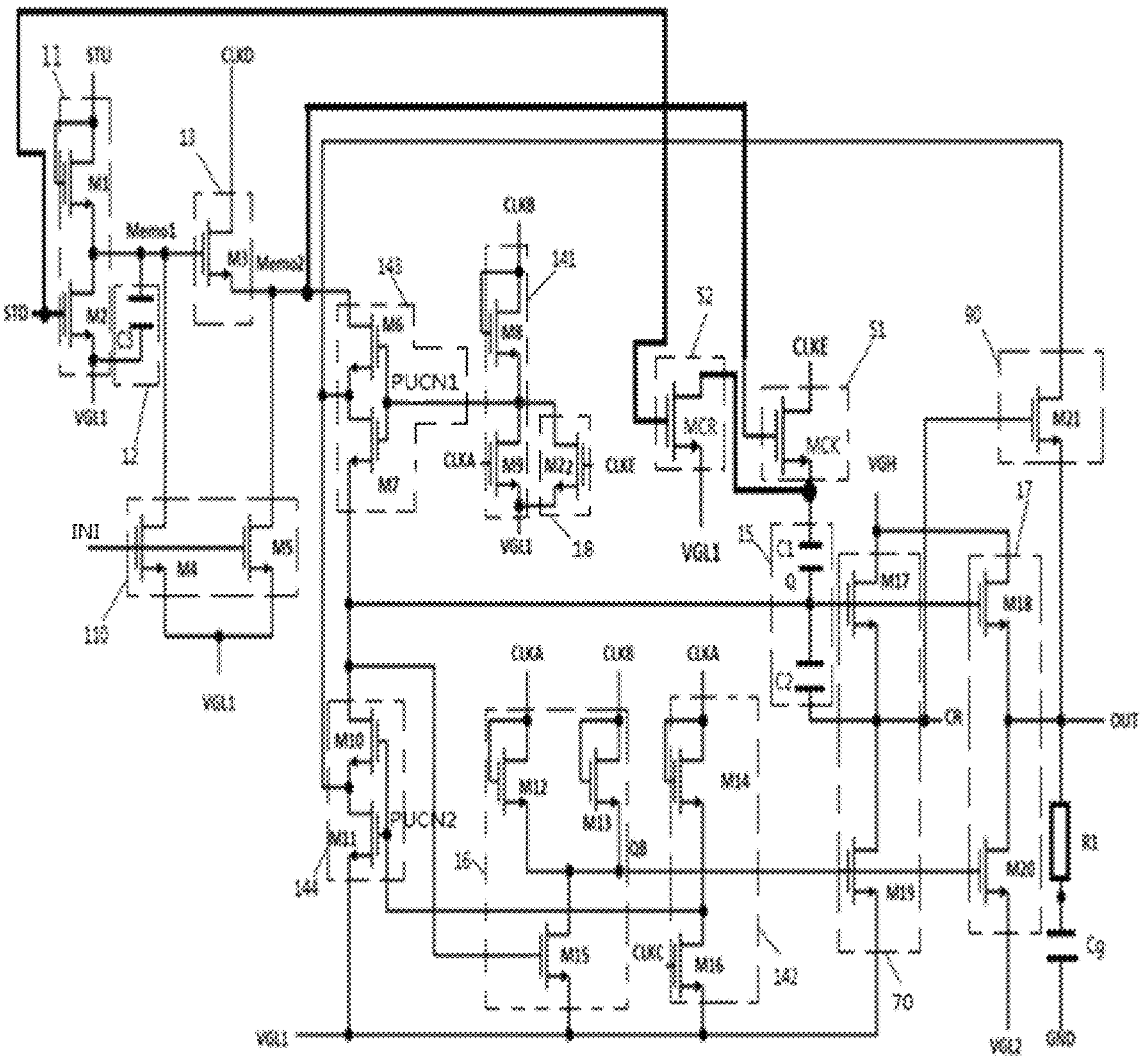
FIG. 15 is a circuit diagram of a shift register unit according to the second embodiment of the present disclosure.

FIG. 15 is a circuit diagram of the shift register unit according to a second embodiment of the present disclosure. Compared with the shift register unit shown in FIG. 12 in the first embodiment, the difference is that the clock receiving control circuit 51 and the storage reset circuit 52 are added.

The clock receiving control circuit 51 includes a clock receiving control transistor MCK; a gate electrode of the clock receiving control transistor MCK is connected to the second storage node Memo2, and a drain electrode of the clock receiving control transistor MCK is connected to a drain electrode of the fifth clock signal input end CLKE, and the source electrode of the clock receiving control transistor MCK is connected to the first end of the first capacitor C1.

The storage reset circuit 52 includes a storage reset transistor MCR, a gate electrode of the storage reset transistor MCR is connected the reset end STD, a drain electrode of the storage reset transistor MCR is connected to a first end of the first capacitor C1, and a source electrode of the storage reset transistor MCR is connected to the first low voltage VGL1.

In the specific implementation, during the time period of CLKD inputting a high level, if CLKC inputs a double pulse clock signal, OUT outputs a double pulse gate driving signal. In actual operation, the fifth clock signal inputted by CLKE is delayed by a predetermined time to the second clock signal.

In the second embodiment shown in FIG. 15, the gate electrode of the MCK is controlled by the second storage node Memo2, and only when the shift register unit of the current row performs an operation (that is, the potential of Memo2 is a valid level), MCK is turned on. The potential of the pull-up node Q is raised by the pulse outputted by CLKE, and the resetting of the potential of the pull-up node Q is controlled by the reset end STD, so that the potential of the pull-up node Q is absolutely a low level during the non-display time period.

Figure 16:
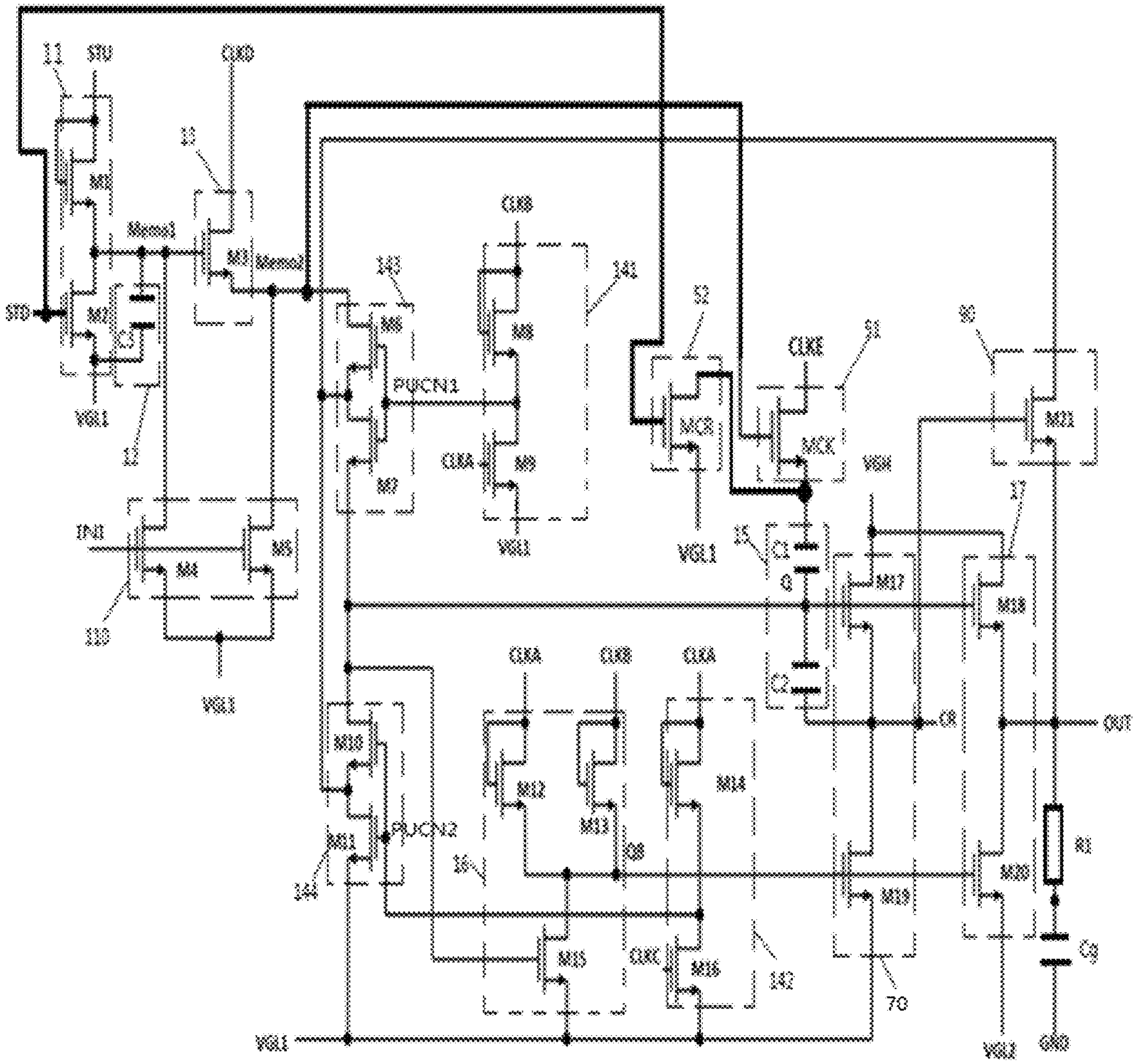
FIG. 16 is a circuit diagram of a shift register unit according to the third embodiment of the present disclosure.

FIG. 16 is a circuit diagram of the shift register unit according to a third embodiment of the present disclosure. As compared with the shift register unit shown in FIG. 15, the difference is that M22 is removed.

A method for driving a shift register unit includes: within a display period, there are an input phase, an output phase and a reset phase.

In the input phase, the input reset circuit controls to connect the first storage node and the input end under the control of the input end, and the first storage node potential maintaining circuit controls to maintain the potential of the first storage node; the second storage node potential control circuit controls to connect the second storage node and the first clock signal input end under the control of the first storage node; the pull-down node control circuit controls the potential of the pull-down node to be a valid level under the control of the pull-down node control end; the pull-up node control circuit controls to connect the pull-up node and the second voltage input end under the control of the second clock signal input end and the third clock signal input end; the gate driving output circuit controls the gate driving signal output end to output a fifth voltage under the control of the pull-up node and the pull-down node.

In the output stage, the input reset circuit controls to disconnect the connection between the first storage node and the input end under the control of the input end, the first storage node potential maintaining circuit controls to maintain the potential of the first storage node; the second storage node potential control circuit controls to connect the second storage node and the first clock signal input end under the control of the first storage node; the pull-up node control circuit controls the potential of the pull-up node to be a valid level under the control of the second storage node, the second clock signal input end and the fourth clock signal input end; a pull-down node control circuit controls to connect the pull-down node and the third voltage input end under the control of the pull-up node; the gate driving output circuit controls the gate driving signal output end to output the fourth voltage under the control of the pull-up node and the pull-down node.

In the reset phase, the input reset circuit controls to connect the first storage node and the reset end under the control of the reset end, and the second storage node potential control circuit controls to disconnect the connection between the second storage node and the first clock signal input end under control of the first storage node; the pull-up node control circuit controls to connect the pull-up node and the second voltage input end under the control of the second clock signal input end and the third clock signal input end; the pull-down node control circuit controls the potential of the pull-down node to be a valid level under the control of the pull-down node control end, the gate driving output circuit controls the gate driving signal output end to output a fifth voltage under the control of the pull-up node and the pull-down node.

In a specific implementation, the pull-up node control circuit may include: a first pull-up control node control sub-circuit, a second pull-up control node control sub-circuit, a first pull-up node control sub-circuit, and a second pull-up node control sub-circuit.

In the output stage, the pull-up node control circuit controls the potential of the pull-up node to be a valid level under the control of the second storage node, the second clock signal input end and the fourth clock signal input end includes: in the output stage, the first clock signal input end, the second clock signal input end, and the fourth clock signal input end all input a first level, and the second storage node potential control circuit controls to connect the second storage node and the first clock signal input end under the control of the first storage node, thereby controlling the potential of the second storage node to be a first level; the first pull-up control node control sub-circuit controls the potential of the first pull-up control node to be a first level under the control of the fourth clock signal input end, and the first pull-up node control sub-circuit controls to connect the second storage node and the pull-up node under the control of the first pull-up control node, and the second pull-up control node control sub-circuit controls the potential of the second pull-up control node to be a second level under the control of the second clock signal input end, a second pull-up node control sub-circuit controls to disconnect the pull-up node and the second voltage input end under the control of the second pull-up control node, so that the potential of the pull-up node is a valid level.

In a specific implementation, the pull-up node potential maintaining circuit may include: a first capacitor, the first end thereof being connected to the fifth clock signal input end, the second end thereof being connected to the pull-up node; and the shift register unit further includes a pull-up node potential control circuit, and the method for driving the shift register unit further includes: in the output stage, after the first pull-up node control sub-circuit controls to connect the second storage node and the pull-up node under the control of the first pull-up control node, the pull-up node potential control circuit controls to connect the first pull-up control node and the second voltage input end under control of the fifth clock signal input end, so that the first pull-up node control sub-circuit controls to disconnect the second storage node and the pull-up node under control of the first pull-up control node, and the potential of the pull-up node is pulled up by the bootstrap of the first capacitor.

In a specific implementation, the pull-up node potential maintaining circuit may include: a first capacitor, the first end there of being connected to the fifth clock signal input end, the second end thereof being connected to the pull-up node; and the shift register unit further includes a clock receiving control circuit and a storage reset circuit, wherein the first end of the first capacitor is connected to the fifth clock signal input end through the clock receiving control circuit; the method for driving the shift register unit may further include: in the output stage, the clock receiving control circuit controls to connect the fifth clock signal input end and the first end of the first capacitor under the control of the second storage node, so that the potential of the pull-up node is pulled up by the bootstrap of the first capacitor; in the reset phase, the storage reset circuit controls to reset the potential of the first end of the first capacitor under the control of the reset end, so as to release the charge stored in the first capacitor.

A gate driving circuit includes the above shift register units of multiple stages.

When the shift register unit includes a carry signal output end, except for the shift register unit of the first stage, the input end of the shift register unit of each stage is connected to the carry signal output end of the shift register unit of a previous stage; and except for the shift register unit of the last stage, the reset end of stage shift register unit of each stage is connected to the carry signal output end of the shift register unit of the next stage.

A display device according to an embodiment of the present disclosure includes the above-described shift register unit.

The above are some embodiments of the present disclosure, and it should be noted that those skilled in the art can also make improvements and modification without departing from the principles of the present disclosure. Such improvements and modification should be considered as within the protection scope of the present disclosure.

What is claimed is:

1. A shift register unit, comprising an input end, a reset end, and a gate driving signal output end, wherein the shift register unit further comprises:

an input reset circuit, connected to the input end, the reset end, a first voltage input end and a first storage node, and configured to control to connect or disconnect the first storage node and the input end under the control of the input end, and to control to connect or disconnect the first storage node and the first voltage input end under the control of the reset end;

a first storage node potential maintaining circuit, configured to, when the input reset circuit controls to disconnect the first storage node and the first voltage input end under the control of the reset end, maintain a potential of the first storage node;

a second storage node potential control circuit, connected to the first storage node, the second storage node, and a first clock signal input end, and configured to control to connect or disconnect the second storage node and the first clock signal input end under the control of the first storage node;

a pull-up node control circuit, connected to the second storage node, a second clock signal input end, a third clock signal input end, a fourth clock signal input end and a second voltage input end, and configured to control the potential of the pull-up node to be a valid level under the control of the second storage node, the second clock signal input end, and the fourth clock signal input end, control to connect or disconnect the pull-up node and the second voltage input end under the control of the second clock signal input end and the third clock signal input end;

a pull-up node potential maintaining circuit, connected to the pull-up node;

a pull-down node control circuit, connected to the pull-down node, the pull-up node, a pull-down node control end, and a third voltage input end; and a gate driving output circuit, connected to the pull-up node, the pull-down node, the gate driving signal output end, a fourth voltage input end and a fifth voltage input end.

2. The shift register unit according to claim 1, wherein the pull-up node control circuit comprises:

a first pull-up control node control sub-circuit, connected to the first pull-up control node, the third clock signal input end, the fourth clock signal input end, and the second voltage input end, and configured to control to connect or disconnect the first pull-up control node and the fourth clock signal input end under the control of the fourth clock signal input end, and control to connect or disconnect the first pull-up control node and the second voltage input end under the control of the third clock signal input end;

a second pull-up control node control sub-circuit, connected to the second pull-up control node, the second clock signal input end, the third clock signal input end, and the second voltage input end, and configured to control to connect or disconnect the second pull-up control node and the third clock signal input end under the control of the third clock signal input end, and control to connect or disconnect the second pull-up control node and the second voltage input end under the control of the second clock signal input end;

a first pull-up node control sub-circuit, connected to the first pull-up control node, the second storage node, and the pull-up node, and configured to control to connect or disconnect the second storage node and the pull-up node under the control of the first pull-up control node; and a second pull-up node control sub-circuit, connected to the second pull-up control node, the pull-up node and the second voltage input end, and configured to control to connect or disconnect the pull-up node and the second voltage input end under the control of the second pull-up control node.

3. The shift register unit according to claim 2, wherein the pull-up node potential maintaining circuit comprises a first capacitor, a first end of the first capacitor is connected to a fifth clock signal input end, and a second end of the first capacitor is connected to the pull-up node.

4. The shift register unit according to claim 3, further comprising a pull-up node potential control circuit, connected to the fifth clock signal input end, the first pull-up control node and the second voltage input end, and configured to control to connect or disconnect the first pull-up control node and the second voltage input end under the control of the fifth clock signal input end.

5. The shift register unit according to claim 4, wherein the pull-up node potential control circuit comprises a pull-up node potential control transistor, a gate electrode of the pull-up node potential control transistor being connected to the fifth clock signal input end, a first electrode of the pull-up node potential control transistor being connected to the first pull-up control node, and a second electrode of the pull-up node potential control transistor being connected to the second voltage input end.

6. The shift register unit according to claim 5, further comprising a clock receiving control circuit and a storage reset circuit, wherein the first end of the first capacitor is connected to the fifth clock signal input end through the clock receiving control circuit;

the clock receiving control circuit is further connected to the second storage node, and configured to control to connect or disconnect the first end of the first capacitor and the fifth clock signal input end under the control of the second storage node; and the storage reset circuit is connected to the reset end, the first end of the first capacitor and a sixth voltage input end, and configured to control to connect or disconnect the first end of the first capacitor and the sixth voltage input end under the control of the reset end.

7. The shift register unit according to claim 6, wherein the clock receiving control circuit comprises a clock receiving control transistor; a gate electrode of the clock receiving control transistor is connected to the second storage node, and a first electrode of the clock receiving control transistor is connected to the fifth clock signal input end, and a second electrode of the clock receiving control transistor is connected to the first end of the first capacitor; and the storage reset circuit comprises a storage reset transistor, a gate electrode of the storage reset transistor is connected to the reset end, a first electrode of the storage reset transistor is connected to a first end of the first capacitor, and a second electrode of the storage reset transistor is connected to the sixth voltage input end.

8. The shift register unit according to claim 3, further comprising a carry signal output end and a carry output circuit, wherein the carry output circuit is connected to the pull-up node, the pull-down node, the carry signal output end, the fourth voltage input end and a seventh voltage input end, configured to control to connect the carry signal output end and the fourth voltage input end when the potential of the pull-up node is a valid level, and control to connect the carry signal output end and the seventh voltage input end when the potential of the pull-down node is a valid level;

the carry signal output end is configured to provide a reset signal for a reset end of a shift register unit of previous stage, and is configured to provide an input signal to an input end of the shift register unit of next stage; and the pull-up node potential maintaining circuit further comprises a second capacitor, the first end of the second capacitor is connected to the pull-up node, and the second end of the second capacitor is connected to the carry signal output end.

9. The shift register unit according to claim 8, wherein the pull-down node control circuit is configured to control a potential of the pull-down node to be a valid level under the control of the pull-down node control end, and control to connect or disconnect the pull-down node and the third voltage input end under the control of the pull-up node; and the gate driving output circuit is configured to control to connect the gate driving signal output end and the fourth voltage input end when the potential of the pull-up node is a valid level, and control to connect the gate driving signal output end and the fifth voltage input end when the potential of the pull-down node is a valid level.

10. The shift register unit according to claim 9, wherein the gate driving output circuit comprises a first gate driving output transistor and a second gate driving output transistor, a gate electrode of the first gate driving output transistor is connected to the pull-up node, a first electrode of the first gate driving output transistor is connected to the fourth voltage input end, and a second electrode of the first gate driving output transistor is connected to the gate driving signal output end;

a gate electrode of the second gate driving output transistor is connected to the pull-down node, a first electrode of the second gate driving output transistor is connected to the gate driving signal output end, and a second electrode of the second gate driving output transistor is connected to the fifth voltage input end;

the carry output circuit comprises a first carry signal output transistor and a second carry signal output transistor;

a gate electrode of the first carry signal output transistor is connected to the pull-up node, a first electrode of the first carry signal output transistor is connected to the fourth voltage input end, and a second electrode of the first carry signal output transistor is connected to the carry signal output end; and a gate electrode of the second carry signal output transistor is connected to the pull-down node, a first electrode of the second carry signal output transistor is connected to the carry signal output end, and a second electrode of the second carry signal output transistor is connected to the seventh voltage input end.

11. The shift register unit according to claim 10, wherein the input reset circuit comprises an input transistor and a reset transistor;

a gate electrode of the input transistor and a first electrode of the input transistor are both connected to the input end, and a second electrode of the input transistor is connected to the first storage node; and a gate electrode of the reset transistor is connected to the reset end, a first electrode of the reset transistor is connected to the first storage node, and a second electrode of the reset transistor is connected to the first voltage input end.

12. The shift register unit according to claim 8, wherein the first pull-up node control sub-circuit comprises a first control transistor and a second control transistor, a gate electrode of the first control transistor and a gate electrode of the second control transistor are both connected to the first pull-up control node, a first electrode of the first control transistor is connected to the second storage node, and a second electrode of the first control transistor is connected to a first electrode of the second control transistor, a second electrode of the second control transistor is connected to the pull-up node;

the first pull-up control node control sub-circuit comprises a third control transistor and a fourth control transistor, a gate electrode of the third control transistor and a first electrode of the third control transistor are connected to the fourth clock signal input end, a second electrode of the third control transistor is connected to the first pull-up control node, a gate electrode of the fourth control transistor is connected to the third clock signal input end, the first electrode of the fourth control transistor is connected to the first pull-up control node, and a second electrode of the fourth control transistor is connected to the second voltage input end;

the second pull-up node control sub-circuit comprises a fifth control transistor and a sixth control transistor, a gate electrode of the fifth control transistor and a gate electrode of the sixth control transistor are connected to the second pull-up control node, a first electrode of the fifth control transistor is connected to the pull-up node, a second electrode of the fifth control transistor is connected to a first electrode of the sixth control transistor, and a second electrode of the sixth control transistor is connected to the second voltage input end; and the second pull-up control node control sub-circuit comprises a seventh control transistor and an eighth control transistor, a gate electrode of the seventh control transistor and a first electrode of the seventh control transistor are both connected to the third clock signal input end, a second electrode of the seventh control transistor is connected to the second pull-up control node, a gate electrode of the eighth control transistor is connected to the second clock signal input end, the first electrode of the eighth control transistor is connected to the second pull-up control node, and a second electrode of the eighth control transistor is connected to the second voltage input end.

13. The shift register unit according to claim 12, further comprising a leakage eliminating circuit, wherein the leakage eliminating circuit is connected to the carry signal output end, the gate driving signal output end, and the second electrode of the first control transistor and a second electrode of the fifth control transistor, and configured to control to connect or disconnect the gate driving signal output end and the second electrode of the first control transistor under the control of the carry signal output end, and control do connect or disconnect the gate driving signal output end and the second electrode of the fifth control transistor.

14. The shift register unit according to claim 13, wherein the leakage eliminating circuit comprises a leakage eliminating transistor, a gate electrode of the leakage eliminating transistor is connected to the carry signal output end, and a first electrode of the leakage eliminating transistor is connected to a second electrode of the first control transistor and the second electrode of the fifth control transistor, and the second electrode of the leakage eliminating transistor is connected to the gate driving signal output end.

15. The shift register unit according to claim 1, wherein the first storage node potential maintaining circuit comprises a third capacitor, a first end of the third capacitor is connected to the first storage node, and a second end of the third capacitor is connected to the first voltage input end; and the second storage node potential control circuit comprises a second storage node potential control transistor, a gate electrode of the second storage node potential control transistor is connected to the first storage node, and a first electrode of the second storage node potential control transistor is connected to the first clock signal input end, and the second electrode of the second storage node potential control transistor is connected to the second storage node.

16. The shift register unit according to claim 1, wherein the pull-down node control end comprises a third clock signal input end and a fourth clock signal input end;

the pull-down node control circuit comprises a first pull-down node control transistor, a second pull-down node control transistor, and a third pull-down node control transistor;

a gate electrode of the first pull-down node control transistor and a first electrode of the first pull-down node control transistor are both connected to the third clock signal input end, and a second electrode of the first pull-down node controls transistor is connected to the pull-down node;

a gate electrode of the second pull-down node control transistor and a first electrode of the second pull-down node control transistor are both connected to the fourth clock signal input end, and a second electrode of the second pull-down node transistor is connected to the pull-down node;

a gate electrode of the third pull-down node control transistor is connected to the pull-up node, a first electrode of the third pull-down node control transistor is connected to the pull-down node, and a second electrode of the third pull-down node control transistor of the transistor is connected to the third voltage input end;

the third clock signal input end is configured to input a third clock signal, and the fourth clock signal input end is configured to input a fourth clock signal, and the third clock signal and the fourth clock signal have inverted phases.

17. The shift register unit according to claim 1, further comprising a storage node reset circuit, connected to the reset control end, the first storage node, the second storage node, and an eighth voltage input end, and configured to control to the first storage node and the second storage node to be both connected to the eighth voltage input end under the control of the reset control end.

18. A method for driving the shift register unit according to claim 1, comprising:

within a display period, in an input phase, the input reset circuit controls to connect the first storage node and the input end under the control of the input end, and the first storage node potential maintaining circuit controls to maintain the potential of the first storage node, the second storage node potential control circuit controls to connect the second storage node and the first clock signal input end under the control of the first storage node, the pull-down node control circuit controls the potential of the pull-down node to be a valid level under the control of the pull-down node control end, the pull-up node control circuit controls to connect the pull-up node and the second voltage input end under the control of the second clock signal input end and the third clock signal input end, the gate driving output circuit controls the gate driving signal output end to output a fifth voltage under the control of the pull-up node and the pull-down node;

in an output stage, the input reset circuit controls to disconnect the connection between the first storage node and the input end under the control of the input end, the first storage node potential maintaining circuit controls to maintain the potential of the first storage node, the second storage node potential control circuit controls to connect the second storage node and the first clock signal input end under the control of the first storage node, the pull-up node control circuit controls the potential of the pull-up node to be a valid level under the control of the second storage node, the second clock signal input end and the fourth clock signal input end, a pull-down node control circuit controls to connect the pull-down node and the third voltage input end under the control of the pull-up node, the gate driving output circuit controls the gate driving signal output end to output the fourth voltage under the control of the pull-up node and the pull-down node; and in a reset phase, the input reset circuit controls to connect the first storage node and the reset end under the control of the reset end, and the second storage node potential control circuit controls to disconnect the connection between the second storage node and the first clock signal input end under control of the first storage node, the pull-up node control circuit controls to connect the pull-up node and the second voltage input end under the control of the second clock signal input end and the third clock signal input end, the pull-down node control circuit controls the potential of the pull-down node to be a valid level under the control of the pull-down node control end, the gate driving output circuit controls the gate driving signal output end to output a fifth voltage under the control of the pull-up node and the pull-down node.

19. The method according to claim 18, wherein the pull-up node control circuit comprises a first pull-up control node control sub-circuit, a second pull-up control node control sub-circuit, a first pull-up node control sub-circuit, and a second pull-up node control sub-circuit;

in the output stage, the pull-up node control circuit controls the potential of the pull-up node to be a valid level under the control of the second storage node, the second clock signal input end and the fourth clock signal input end comprises:

in the output stage, the first clock signal input end, the second clock signal input end, and the fourth clock signal input end all inputting a first level, and controlling, by the second storage node potential control circuit, to connect the second storage node and the first clock signal input end under the control of the first storage node, thereby controlling the potential of the second storage node to be a first level; controlling, the first pull-up control node control sub-circuit, the potential of the first pull-up control node to be a first level under the control of the fourth clock signal input end, and controlling, by the first pull-up node control sub-circuit, to connect the second storage node and the pull-up node under the control of the first pull-up control node, and controlling, by the second pull-up control node control sub-circuit, the potential of the second pull-up control node to be a second level under the control of the second clock signal input end, controlling, by a second pull-up node control sub-circuit, to disconnect the pull-up node and the second voltage input end under the control of the second pull-up control node, so that the potential of the pull-up node is a valid level.

20. The method according to claim 19, wherein the pull-up node potential maintaining circuit comprises a first capacitor, the first end of the first capacitor is connected to a fifth clock signal input end, the second end of the first capacitor is connected to the pull-up node;

the shift register unit further comprises a pull-up node potential control circuit, and the method further comprises:

in the output stage, after the first pull-up node control sub-circuit controls to connect the second storage node and the pull-up node under the control of the first pull-up control node, controlling, by the pull-up node potential control circuit, to connect the first pull-up control node and the second voltage input end under control of the fifth clock signal input end, and controlling, by the first pull-up node sub-circuit, to disconnect the second storage node and the pull-up node under control of the first pull-up control node, and the potential of the pull-up node being pulled up by the first capacitor.

21. The method according to claim 19, wherein the pull-up node potential maintaining circuit comprises a first capacitor, the first end of the first capacitor is connected to a fifth clock signal input end, the second end of the first capacitor is connected to the pull-up node;

the shift register unit further comprises a clock receiving control circuit and a storage reset circuit, the first end of the first capacitor is connected to the fifth clock signal input end through the clock receiving control circuit;

the method further comprises:

in the output stage, controlling, by the clock receiving control circuit, to connect the fifth clock signal input end and the first end of the first capacitor under the control of the second storage node, the potential of the pull-up node being pulled up by the first capacitor; and in the reset phase, controlling, by the storage reset circuit, to reset the potential of the first end of the first capacitor under the control of the reset end, to release charge stored in the first capacitor.

22. A gate driving circuit, comprising multiple stages of shift register units according to claim 1.

23. A display device, comprising the gate driving circuit according to claim 22.

* * * * *